United States Patent [19]
Nagaraj et al.

[11] Patent Number: 5,764,695
[45] Date of Patent: Jun. 9, 1998

[54] ADAPTIVE LINE EQUALIZER

[75] Inventors: Krishnaswamy Nagaraj, Somerville, N.J.; Pan Wu, Bethlehem, Pa.

[73] Assignee: Lucent Technologies Inc., Murray Hill, N.J.

[21] Appl. No.: 756,734

[22] Filed: Nov. 26, 1996

[51] Int. Cl.[6] ............................... H03H 7/30; H03H 7/40
[52] U.S. Cl. ................. 375/232; 364/724.2; 455/234.1; 455/245.1
[58] Field of Search ..................... 375/232, 345, 375/230, 229; 330/280, 279, 278, 254; 348/685, 678; 455/245.1, 234.1, 232.1; 333/18; 364/724.19, 724.2; 379/398, 394

[56] References Cited

U.S. PATENT DOCUMENTS 4,707,840  11/1987  Nakayama ........................ 375/345
5,337,025   8/1994  Polhemus ......................... 375/232

*Primary Examiner*—Stephen Chin
*Assistant Examiner*—Betsy L. Deppe

[57] ABSTRACT

An adaptive equalizer capable of providing compensation for a wide range of cables having different cable characteristics and different cable lengths. The adaptive equalizer comprises a programmable gain amplifier capable of providing a variable amplification factor in response to a feedback control signal. The gain amplifier is configured to receive pulse signals transmitted over a communication channel. A peak detecting equalizer is coupled to the gain amplifier so as to receive its output signals. A pulse shape detector is adapted to receive pulse signals provided by the peak detecting equalizer, and generate a first indication signal indicating over-equalization and a second indication signal indicating under-equalization. A gain control circuit receives the first and second indication signals to provide the feedback control signal to the programmable gain amplifier so as to vary its amplification factor.

13 Claims, 12 Drawing Sheets

FIG. 4 (PRIOR ART)
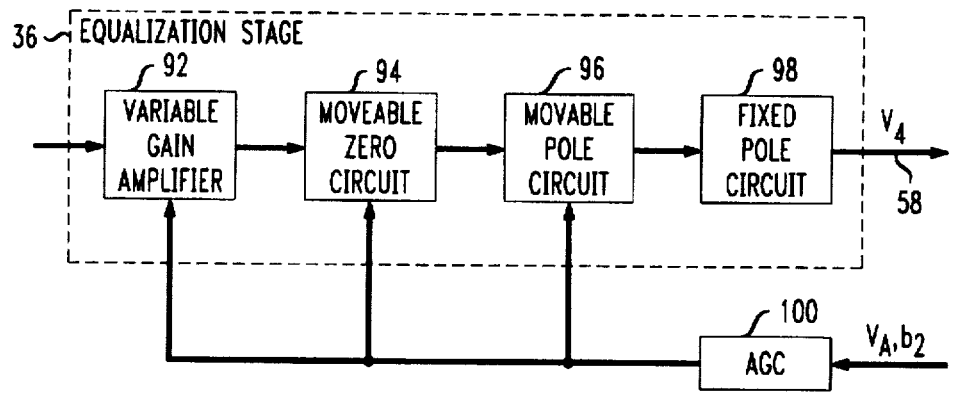
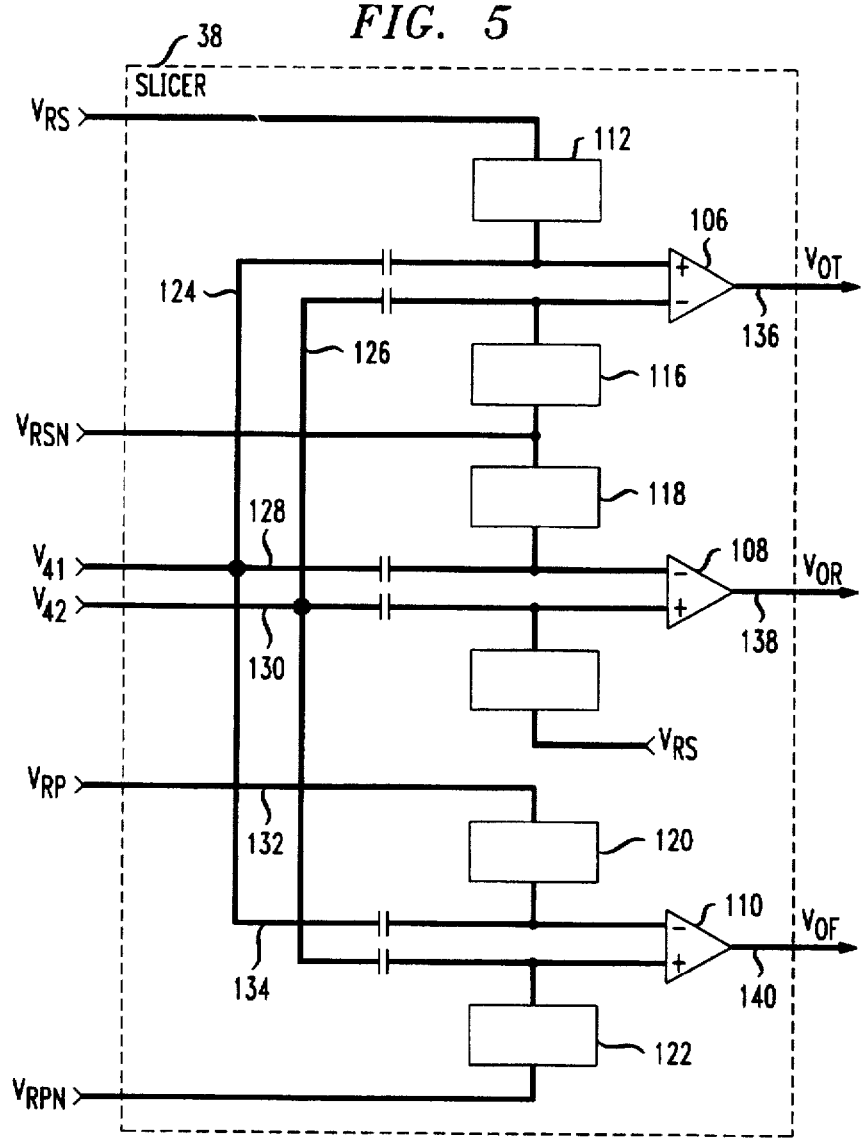
FIG. 5

50

ADAPTIVE LINE EQUALIZER

FIELD OF THE INVENTION

This invention relates to an adaptive line equalizer and more specifically to a control system employed in a feedback control loop to compensate for attenuation and dispersion of signals transmitted over a communication channel.

BACKGROUND OF THE INVENTION

In digital communication applications, transmitted pulse signals may experience substantial attenuation and phase dispersion as they propagate over a communication channel. This attenuation and dispersion depends on many factors including the communication frequency, and the length and the frequency characteristics of the communication channel. In such communications systems, it is desired to employ variable equalizers to compensate for phase variations cud the attenuation characteristics imposed by the transmission channel.

Variable equalizers are well known and were first described in *Variable Equalizers*, Bell System Tech. J., pp 229-244 (H. W. Bode, 1938). Typically, a variable equalizer is capable of changing the amount of the equalization without changing the shape of the transfer characteristics. Such equalizers operate based on detecting a peak voltage signal that signifies proper compensation. Thus, by using a peak detector variable equalizer it is possible to change the amount of equalization with substantially little change in the shape of equalization. Such peak detector variable equalizers are mostly employed in communication cabling environment and in audio systems, where listeners are provided with the most desirable sound by equalizing the appropriate frequency range.

Currently, there are many communication applications, where information is sent via a cable. For example, in a cellular communication environment, each base station communicates with a central processing center via predetermined communication cables. Such cables may have different characteristics or different lengths, which depend on system requirements and geographical constraints. Peak detecting variable equalizers are designed to compensate amplitude and phase variations of signals traveling in such cables, with a cable-length dependent automatic control loop. Thus, for a given cable type with predetermined cable characteristics, the equalizer adjusts signal compensation based on the length of the cable. Such equalizers provide a satisfactory amplitude and phase compensation when they are configured to respond to a predetermined type of cable.

However, in a communication system where different types of cables may be coupled to a receiver, conventional equalizers do not work satisfactorily for either amplitude or phase compensation. Likewise, in a communication system where the same type of cables with various lengths are coupled to a receiver, conventional equalizers do not provide satisfactory amplitude and phase compensation for substantially long cable lengths.

Hence, there is a need for an adaptive equalizer that is capable of providing appropriate compensation for a wide range of cables having different cable characteristics and different cable lengths.

SUMMARY OF THE INVENTION

An adaptive line equalizer comprises a programmable gain amplifier configured to receive pulse signals transmitted over a communication channel. The programmable gain amplifier is further configured to have a variable amplification factor in response to a feedback control signal. A peak detecting equalizer is adapted to receive output signals of the programmable gain amplifier. A pulse shape detector is adapted to receive pulse signals provided by the peak detecting equalizer. The pulse shape detector is further adapted to generate a first indication signal indicating over-equalization and a second indication signal indicating under-equalization. A gain control circuit is adapted to receive the first and second indication signals. The control circuit is further adapted to provide the feedback control signal to the programmable gain amplifier so as to vary the amplification factor of the amplifier.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof may best be understood by reference to the following detailed description when read with the accompanying drawings in which:

FIG. 4 illustrates a block diagram of a prior art embodiment of an equalization circuit.

FIG. 5 illustrates a block diagram of a slicer employed in one embodiment of the present invention.

FIG. 11b illustrates a block diagram of a fixed resistor circuit employed in the programmable gain amplifier illustrated in FIG. 11a.

FIGS. 11c and 11d illustrate a block diagram of variable resistor circuits employed in the programmable gain amplifier illustrated in FIG. 11a.

DETAILED DESCRIPTION OF THE DRAWINGS

Figure 2:
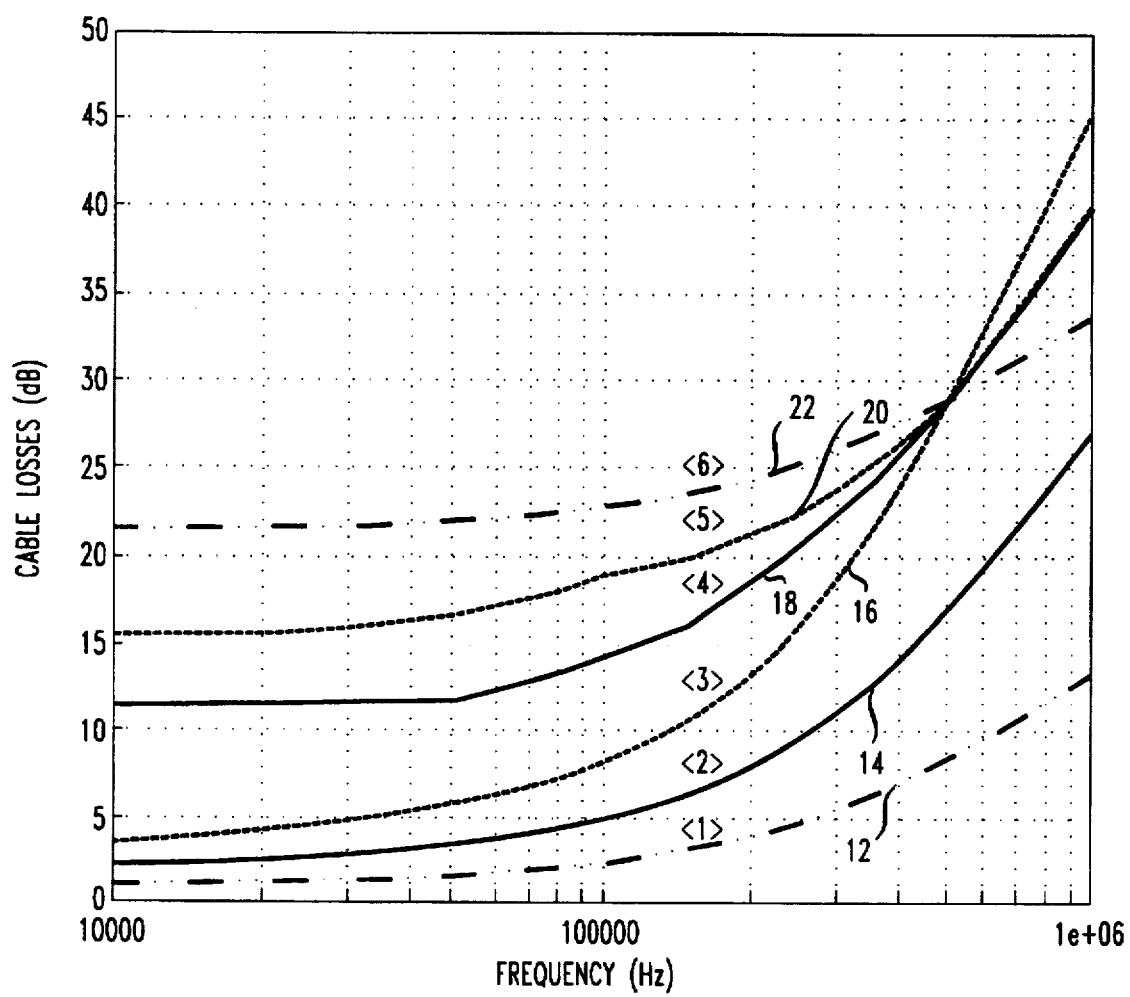
FIG. 2 illustrates plots of frequency response characteristic of different types and different lengths of cable in accordance with the present invention.

FIG. 2 illustrates the frequency response characteristics of different types and different lengths of cable. These frequency characteristics are used to illustrate the principles employed by the present invention in accordance with embodiments described hereinafter. Frequency response plots 12, 14, 16, 1 8, and 20 respectively represent attenuation characteristics of five different kinds of cables, referred to as cables 1, 2, 3, 4, and 5 (not shown). Frequency response plots 12, 14 and 16 represent the frequency responses of cables 1, 2 and 3, which are of the same type but have different cable lengths. The length of cable 1 is shorter than cable 2. The length of cable 2 is shorter than cable 3. As the length of the cable increases, the frequency dependent attenuation of signals traveling in the cables increases also. Furthermore, as the length of the cable increases, the slope of the frequency dependent attenuation increases also. Thus, frequency response plot 14 has a larger slope than frequency response plot 12, and, frequency response plot 16 has a larger slope than frequency response plot 14. Therefore, in an example where a plurality of transmitters send signals over these cables to a receiver, it is desired that the receiver first equalizes these signals, so that the original signals are restored. This signal restoration is accomplished by employing, for example, a conventional peak detecting variable equalizer as described in more detail with reference to FIG. 4. However, such a conventional equalizer is not suitable to equalize signals received from different cable types, as explained hereafter.

Frequency response plots 16, 18, and 20 represent the frequency responses of cables 3, 4, and 5 which are not of the same type, and therefore may have different characteristics. As illustrated in FIG. 2, the attenuation in signals transmitted through cable 4 is more than attenuation in signals transmitted through cable 3. Furthermore, the attenuation in signals transmitted through cable 5 is more than attenuation in signals transmitted through cable 4. However, unlike the situation illustrated with cables 1, 2, and 3, where the slope of frequency dependent attenuation increases, the slope of frequency dependent attenuation corresponding to cables 3, 4, and 5 decreases. Thus, the slope of frequency dependent attenuation is larger for cable types that impose less signal attenuation than for the cable types that impose more attenuation. Because of this phenomena, conventional equalizers designed for different cable lengths cannot be directly used for different cable types.

However, in accordance with one aspect of the invention, it is possible to provide appropriate frequency compensation for different types of cables by employing the same equalizer that is used to provide frequency compensation for the same type of cable having different lengths. FIG. 2 illustrates that when a flat loss of approximately 21 dB is applied to signals transmitted through cable 1, the frequency response of cable 1 would appear substantially the same as a frequency response illustrated by plot 22, which may represent another type of cable, such as cable 6.

As mentioned above, cables 1, 2 and 3 relate to the same type of cable. However, the frequency characteristic of cable 6, as illustrated by plot 22, relates to a different type of cable. This follows because, for example, as the cable loss increases from cable 3 to cable 6, the slope of attenuation decreases. As shown in FIG. 2, however, by applying a flat gain to signals transmitted through cable 6, it is possible to provide equalization for cable 6, by using the same equalizer designed to provide compensation for cables 1, 2 or 3. The flat gain applied to signals transmitted through cable 6 causes the frequency characteristic of cable 6 behave substantially similar to frequency characteristic of cable 1. This phenomena holds true for other types of cables, such as cable 4. Thus, by providing an appropriate gain to signals transmitted in cable 6 or cable 4, an equalizer that is employed to provide compensation for cables 1 2, and 3 can also provide a proper compensation for cables 6 or 4.

Figure 1:
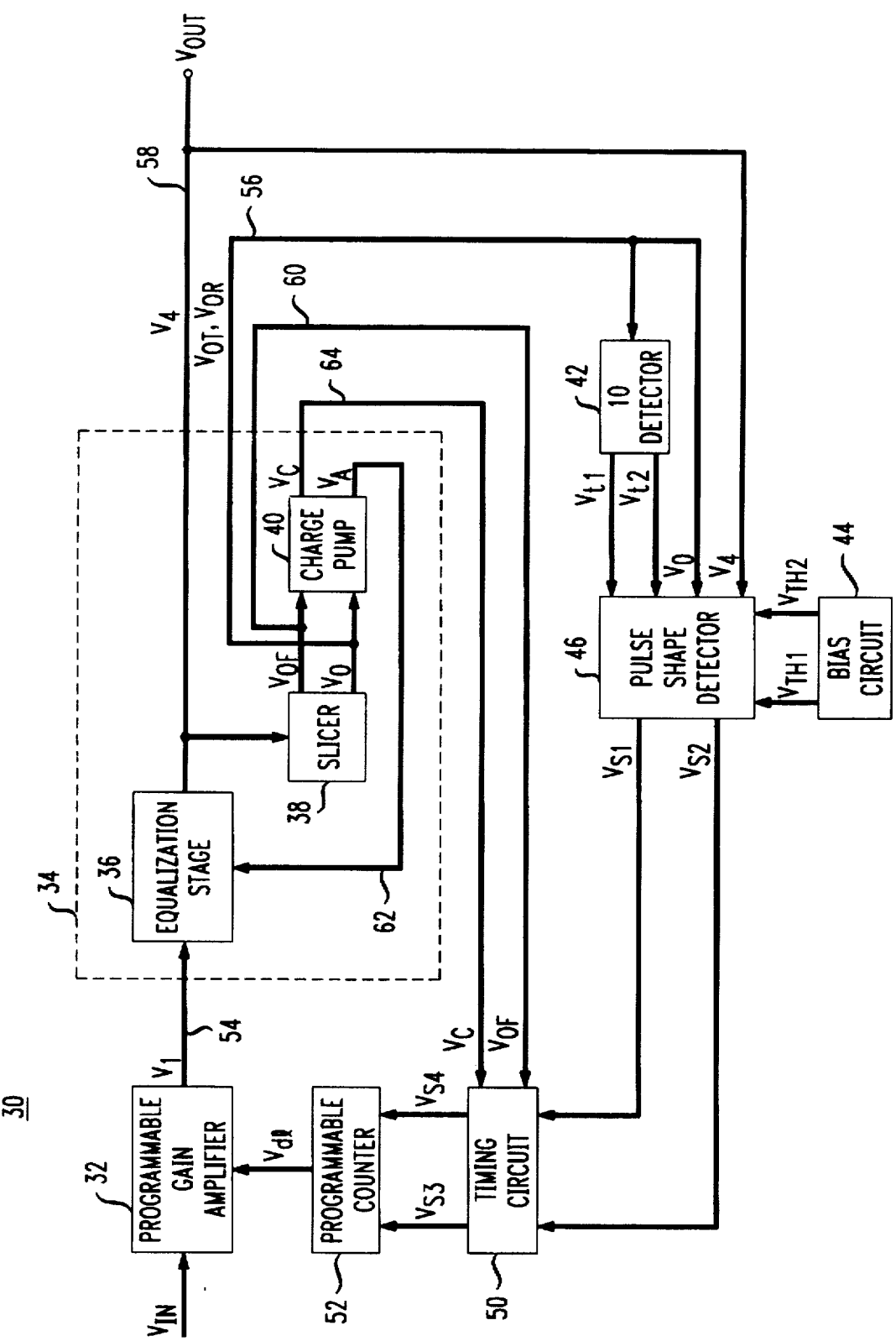
FIG. 1 is a block diagram illustrating one embodiment of a system employing adaptive line equalization in accordance with the present invention

As will be explained in more detail in reference with further embodiments of the invention, in order to compensate the losses of cables with different type of characteristics, a flat gain/loss stage may be employed in addition to a conventional equalizer. For example, a gain/loss stage may be added first to provide an appropriate gain or loss to the signals received by the equalizer, in accordance with the principle explained in reference with FIG. 2. FIG. 1 illustrates an embodiment of an adaptive equalizer 30 that substantially compensates signal attenuation and phase diversion received from cables of different type and different length, although the invention is not limited in scope to this embodiment. A differential input signal $V_{IN}$ is coupled to an input terminal of a programmable gain amplifier 32. Input signal $V_{IN}$ may have been transmitted through a cable having a given length and a given characteristic. Programmable gain amplifier provides an appropriately amplified or attenuated signal $V_1$ to an input terminal of an equalizer 34 through signal line 54.

The operation of conventional equalizers are well-known and described in many publications including: (1) H. W. Bode, "Variable Equalizer," *Bell Systems Technical Journal*, April 1938, pp. 229–244; (2) Cordell, "A New Family of Active Variable Equalizers," *IEEE Transactions: A Circuits and Systems*, Volume CAS-29, No. 5, May 1982; and (3) H. Malvan, "Active—RC Variable Equalizers with Minimum Numbers of Operational Amplifiers," *IEEE Transactions: A Circuits and Systems*, Volume CAS-30, pp496–500, July 1983; all of which have been incorporated herein by reference. These equalizers operate based on detecting a peak signal. In one embodiment of the present invention a peak detecting variable equalizer 34 may be employed, although the invention is not limited in scope to such an equalizer. Peak detecting variable equalizer 34 includes an equalization stage 36 that is configured to receive signal $V_I$. One output terminal of equalization stage 36 provides a differential voltage signal $V_4$ via line 58, to an input terminal of a slicer 38. Slicer 38 generates a voltage signal $V_o$ via a signal line 56, which is a digitized version of the output signal, $V_4$, of equalization stage 36. Voltage signal $V_4$ represents the output voltage $V_{OUT}$ of adaptive equalizer 30. Slicer 38 also generates a peak voltage signal $V_{OF}$ via a signal line 60, which is a function of the output signal of equalization stage 36 as will be explained in more detail hereinafter. Voltage signal $V_{OF}$ goes "high," when the magnitude of voltage signal, $V_4$, reaches a predetermined peak threshold value.

Voltage signals $V_{OF}$ and $V_O$ are coupled to input terminals of a charge pump 40, which functions in conjunction with an automatic gain control circuit to adjust equalization stage 36 for detecting the predetermined peak threshold voltage. Based on the value of voltage signals $V_{OF}$ and $V_O$, charge pump 40 generates two voltage signals $V_A$ and $V_C$, as explained in more detail with reference to FIG. 6. Voltage signal $V_A$ is coupled to an input terminal of equalization stage 36 via a feedback signal line 62.

Voltage signal $V_O$ is coupled to an input terminal of a "1,0" detector 42 via signal line 56. When the input signal to detector 42 is a logical "1" followed by a logical "0," detector 42 generates two signal indications $V_{r1}$ and $V_{r2}$. It will be appreciated that in accordance with one embodiment of the present invention, a logical "1" represents a pulse signal that has a given duty cycle less than 100%. This pulse signal corresponds to pulse signals transmitted in those cables that are coupled to equalizer 30.

In most cable transmission applications, binary pulses may be transmitted through the cables. These binary pulses are converted to "alternate marked inversion" (AMI) format for cable transmission. Each logical "1" pulse in AMI format has a given period comprising a binary "+1" or a binary "−1" followed by a zero voltage signal, depending on the duty cycle of the pulse. However, consecutive binary 1 signals have inverse polarities in AMI format. Thus, a binary 1 may be represented by a positive voltage signal "+1" followed by a period of "0" depending on the duty cycle. The following binary 1 signal is then represented by a negative voltage signal "−1" followed by a period "0" depending on the duty cycle. It will be appreciated that in those applications that AMI format of signaling is used, a logical "1" voltage signals $V_O$ may be a "+1" followed by "0" or "−1" followed by "0." These signals are respectively referred to as $V_{OT}$ and $V_{OR}$. Therefore, for these signals, a logical "1" may be either a voltage signal $V_{OR}$ or a voltage signal $V_{OT}$.

Voltage signals, $V_{r1}$ and $V_{r2}$, are coupled to first and second input terminals of pulse shape detector 46. Similarly, voltage signals $V_O$ and $V_4$ are coupled to a third and fourth input terminals of pulse shape detector 46. Pulse shape detector 46 also receives two biasing voltage signals $V_{TH1}$ and $V_{TH2}$ generated by a bias circuit 44. Pulse shape detector 46 generates two output signals $V_{S1}$ and $V_{S2}$, which are respectively coupled to input terminals of a timing circuit 50. Timing circuit 50 also receives two signals $V_{OF}$ and $V_C$ via signal lines 60 and 64. In response, timing circuit 50 generates two signals $V_{S3}$ and $V_{S4}$, which respectively correspond to signals $V_{S1}$ and $V_{S2}$.

Voltage signals $V_{S3}$ and $V_{S4}$ are coupled to a programmable counter 52. Counter 52 generates a count signal coupled to an input terminal of programmable gain amplifier 32. Counter 52 increments its count by "1" or decrements its count by "1" in response to voltage signals $V_{S3}$ and $V_{S4}$. When equalizer 30 has stabilized, the count signal provided by counter 52 remains constant. Programmable counter 52 is perfectly configured to provide a predetermined count signal when adaptive equalizer 30 is initialized.

It will be appreciated that the principles employed by the present invention is not limited in scope to the embodiment illustrated and described in reference with FIG. 1. Furthermore, the configuration and operation of exemplary embodiments of each component illustrated in FIG. 1 is described in more detail hereinafter. During operation, equalizer 30 is advantageously employed to receive pulse signals transmitted via a plurality of different cables having different lengths or different properties. These signals are subjected to a gain or attenuation at programmable gain amplifier 32. These amplified or attenuated signals are then fed to peak detecting equalizer 34. The output signal of programmable gain amplifier 32 is coupled to equalization stage 36, which functions as a variable amplifier having a gain designed to have the same frequency characteristics as the frequency characteristics associated with the loss in the communication cable. As will be explained in more detail in reference with FIG. 4, equalization stage 36 has a variable flat gain and several moveable "poles" and "zeros." The definition of "poles" and "zeros" in the context of electronic systems is well-known and described in J. Milman, *Microelectronics*. McGraw Hill (1983), incorporated herein by reference. The variable flat gain and the moveable "poles" and "zeros" of equalization stage 36 are controlled by control signal $V_A$ provided by charge pump 40 via signal line 62. Charge pump 40 generates this control signal by monitoring the peak signal level at the output of equalization stage 36 provided through slicer 38. Control signal $V_A$ becomes stable when the output voltage signal $V_4$ of equalization stage 36 reaches a given peak magnitude for a substantial period of time. Thus equalization stage 36 in conjunction with charge pump 40 functions in an internal feedback loop system to provide peak detecting equalization. While equalization stage 36 is being substantially stabilized, the gain of programmable gain amplifier 32 remains substantially constant.

An external feedback loop system is advantageously formed by "1,0" detector 42, pulse shape detector 46, timing circuit 50 and programmable counter 52. Based on the shape of signals provided by peak detecting equalizer 34, programmable counter 52 generates a count signal that controls the gain of programmable gain amplifier 32. The operation of pulse shape detector 46 is explained in more detail in reference with FIG. 8.

Figure 3:
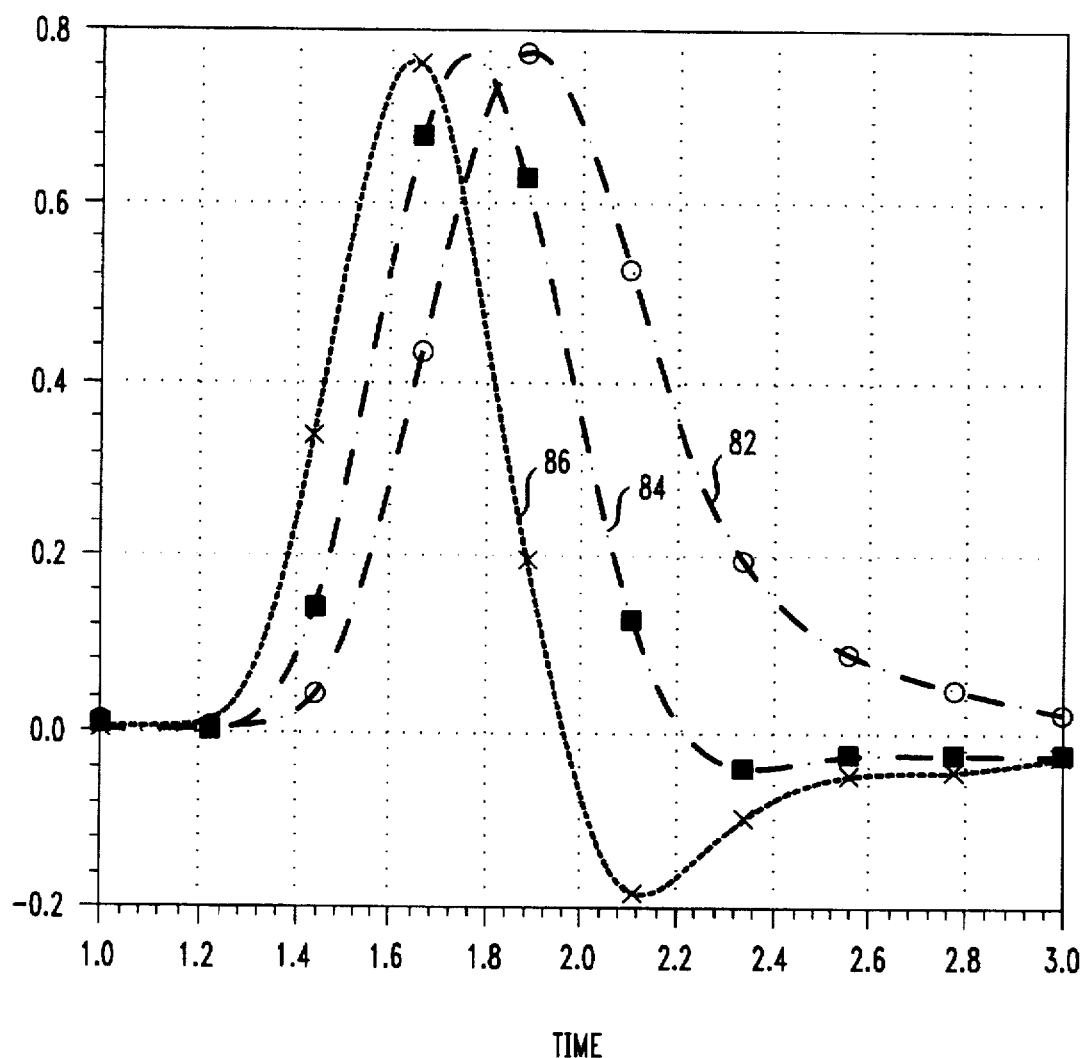
FIG. 3 illustrates the shape of pulse signals experiencing proper equalization, over-equalization and under-equalization in accordance with the present invention.

FIG. 3 illustrates three exemplary pulse signals that are provided by a peak detecting variable equalizer such as 34, in response to signals transmitted via cables having different characteristics. The frequency response of these cables may be represented by frequency response plots 16, 18 and 20 of FIG. 2. Pulse signal 84 of FIG. 3, represents an output signal that may be generated by peak detecting equalizer 34, which is designed to compensate signals for a particular cable type such as the one that exhibits a frequency response in accordance with frequency response plot 18 of FIG. 2. Pulse signals 86 and 82 represent an output signal generated by the same peak detecting equalizer, in response to signals received via cables having frequency response plots 16 and 20 of FIG. 2. Because the peak detecting equalizer is not designed to compensate for cables with frequency response plots 16, and 20, pulse signals transmitted via these cables are not properly compensated by the equalizer. The transfer characteristics of the peak detecting equalizer in response to those cables are illustrated by pulse signals 86 and 82, respectively.

The frequency of the particular pulse signals illustrated in FIG. 3 is approximately 1.544 MHZ. Thus the period of each pulse signal is approximately 0.668 μsec. Each clock cycle begins at the rising edge at approximately the time that the pulse signal reaches its peak magnitude, such as 1.76 μsec for pulse signal 84.

It will be appreciated that signals transmitted via cables, which are not deemed appropriate for the peak detecting equalizer, will experience a substantial amount of intersymbol interference after being processed by the peak detecting equalizer. Specifically, pulse signal 86 experiences a substantially large overshoot following a logical "1" signal, because of over-equalization in a relatively high frequency range. Pulse signal 82 experiences a substantially large undershoot following a logical "1" signal. Pulse signal 82 includes a long tail, which extends into the time slot of a following pulse, because of under-equalization in a relatively high frequency range.

Pulse shape detector 46 in conjunction with "1,0" detector 42 detects over and under-equalization of received pulse signals. In one embodiment of the invention, slicer 38 upon detecting a pulse signal generates a voltage signal $V_O$. Detector 42 monitors the incoming pulses to determine whether a logical "1" signal has been followed by a logical "0" signal. When detector 42 indicates that a logical "1" signal has followed a logical "0" signal it generates voltage signal $V_a$ (FIG. 1). In response, pulse shape detector 46 samples the magnitude of the voltage signal at preferably the middle point of the time slot allocated for receiving the logical "0" pulse signal to detect an undershoot. Pulse shape detector 46 then compares the amplitude of this voltage signal with a predetermined threshold value. If the amplitude of this voltage signal is larger than the predetermined threshold value and if detector 42 has simultaneously detected a logical "1" followed by a logical "0", pulse shape detector generates an indication signal $V_{B1}$ indicating that an under-equalization has occurred.

In order to detect over-equalization, pulse shape detector 46 begins sampling the amplitude of a voltage pulse signal at preferably the middle point of the time slot allocated for receiving the "0" portion of a logical "1" signal. At this time, detector 42 generates a voltage signal $V_{r2}$. In response, pulse shape detector 46 then compares the amplitude of this voltage signal with a predetermined threshold value. If the amplitude of this voltage signal is larger than the predetermined threshold value and if detector 42 has simultaneously detected a logical "1" followed by a logical "0", pulse shape detector generates an indication signal $V_{B2}$ indicating that an over-equalization has occurred.

Thereafter, signals $V_{B1}$ and $V_{B2}$ may be provided to a timing circuit 50. Timing circuit 50 receives a signal indicating whether an over or under-equalization has occurred. Timing circuit 50 functions as a gate, which transfers this indication signal at a predetermined time. This predetermined time is based on an estimate of the length of time required for peak detecting equalizer 34 to stabilize. Thus, equalizer 34 sends two signals $V_C$ and $V_{OF}$ to timing circuit 50 to provide an indication as to the time it may stabilize. The operation of timing circuit 50 in conjunction with signals $V_C$ and $V_{OF}$, will be explained in more detail below with reference to FIG. 10.

The timing circuit is employed to provide system convergence. Because the equalizer 30 includes two feedback loops, it is preferable to ensure that the two loops do not operate at the same time. As illustrated in FIG. 1, these two loops are comprised of a feedback loop with peak detecting equalizer 34, and an outside feedback loop that controls the operation of programmable gain amplifier 32 and will be explained hereafter. Thus, the timing circuit follows the operation of equalizer 34 to detect the time which equalizer 34 has been substantially stabilized. Meanwhile, timing circuit 50 operates as a holding circuit that prevents the outside loop from operating. Once equalizer 34 has been substantially stabilized, timing circuit allows the outside loop to operate.

When timing circuit 50 determines that peak detecting equalizer 34 has stabilized, it provides a signal, $V_{S3}$, or $V_{S4}$, to programmable counter 52 to indicate over-equalization or under-equalization respectively. Signal, $V_{S3}$, is set to a logical "1" to indicate under-equalization. Signal, $V_{S4}$, is set to logical "1" to indicate over-equalization. When there is no over or under-equalization, signals $V_{S3}$ and $V_{S4}$, remain at logical "0." Programmable counter 52 increments by "1" when it detects a logical "1" for signal $V_{S3}$. Conversely, counter 52 decrements by "1" when it detects a logical "1" for signal $V_{S4}$. In one embodiment of the invention, programmable counter 52 may be initially set to a predetermined number, although the invention is not limited in scope in this respect. This number is then incremented or decremented based on indication signals received by timing circuit 50.

Programmable counter 52 provides a count signal representing a count number to programmable gain amplifier 32. Based on this number, programmable gain amplifier 32 adjusts its gain or attenuation factor to amplify or attenuate the incoming signal $V_{IN}$ to equalizer 30. Since the voltage, $V_1$ provided at the input terminal of equalizer 34 is varied, voltage $V_4$ will also change, which results in equalizer 34 becoming unstable again. This gain or attenuation factor remains constant until peak detecting equalizer 34 stabilizes again and sends a signal indicating such stabilization to timing circuit 50. In response, timing circuit 50 again provides an indication signal, to programmable counter 52, which indicates over or under-equalization. Programmable counter 52 then sends a new count signal to programmable gain amplifier 32. This operation repeats until pulse shape detector 46 determines that there is no over or under-equalization, and thus timing circuit 50 provides a logical "0" to programmable counter 52. The absence of over or under-equalization means that equalizer 30 is compensating incoming signals as desired.

The operation of a preferred embodiment of each of the components of equalizer 30 is described in more detail hereinafter, although the invention is not limited in scope to this preferred embodiment and other circuits that provide substantially similar functions may be employed in accordance with the present invention.

Equalization Stage 36

FIG. 4 illustrates one embodiment 36 of an equalization stage in a peak detecting equalizer in accordance to the present invention. As mentioned earlier, the principle of operation of equalization stage 36 is well known. Equalization stage 36 includes a variable gain amplifier 92 that receives the output signal of programmable gain amplifier 32 at one of its input terminals. The output signal of variable gain amplifier 92 is coupled to an input terminal of a movable zeros circuit 94. The output signal of movable zeros circuit 94 is coupled to an input terminal of moveable poles circuit 96. Furthermore, the output signal of moveable poles circuit 96 is coupled to an input terminal of fixed poles circuit 98. The output signal of fixed poles circuit 98 provides signal $V_4$ via line 58 as explained above in reference with FIG. 1. A feedback control signal $V_A$ generated at charge pump 40 is coupled, via line 62, to an automatic gain control circuit 100. Automatic gain control circuit 100 generates appropriate voltage signals in response to feedback control signal $V_A$ to control variable gain amplifier 92, and circuits 94 and 96 respectively as explained above in reference with FIG. 1.

Thus, during operation, in response to feedback control signal $V_A$, the output signals generated by automatic gain control circuit 100 alter the poles and zeros of equalization stage 36, until a desired signal compensation is achieved. When signals received by equalization stage 36 reach their peak level, signal $V_A$ becomes stable, indicating that peak detecting equalizer 34 has substantially stabilized. At this point equalizer 34 may not be able to provide better compensation, if necessary, without further gain adjustments at programmable gain stage 32 When equalizer 30 (FIG. 1) receives signals from the same type of cable, peak detecting equalizer 34 functions substantially satisfactorily. However, as mentioned earlier, when different types of cables are coupled to equalizer 30, the output of peak detecting equalizer 34 may appear as pulse signals illustrated by plots 86 or 82. Pulse signals illustrated by plot 86 are over equalized by peak detecting equalizer 34, and, pulse signals illustrated by plot 82 are under equalized. In both situations, peak detecting equalizer 34 does not provide a substantially satisfactory performance, leading to signal distortions.

Slicer 38

FIG. 5 illustrates an embodiment of a slicer circuit such as 38 in accordance with the present invention, although the scope of the invention is not limited in this context. Slicer circuit 38 provides a digital version of the signal $V_4$ provided by equalization stage 36. Typically, the output signal of equalization stage 36 is generated by a differential-pair amplifier. Thus, the output signal $V_4$ comprises differential signals $V_{41}$ and $V_{42}$. Therefore, for this particular embodiment signal $V_4$ refers to differential signals $V_{41}$ and $V_{42}$.

Slicer circuit 38 includes three operational amplifiers such as 106, 108 and 110, which function as comparators. Amplifier 106 provides an output signal $V_{OT}$ via line 136. Amplifier 108 provides an output signal $V_{OR}$ via line 138. Amplifier 110 provides an output signal $V_{OF}$ via line 140. All three operational amplifiers receive signals $V_{41}$ and $V_{42}$, via lines 124 and 126, at their respective inverting and non inverting terminals.

Biasing signals $V_{RS}$ and $V_{RSN}$ are applied to lines 124 and 126 via resistance networks 112 and 116 respectively. Amplifier 106 is biased by signals $V_{RS}$ and $V_{RSN}$, such that when $V_4-V_{42}$ is larger than some threshold value, such as $(V_{RSN}-V_{RS})$, output signal $V_{OT}$ is set to "+1." Amplifier 108 is biased by signals $V_{RSN}$ and $V_{RS}$ via resistance network 118 and 119 respectively, such that when $V_{41}-V_{42}$ is smaller than $(V_{RS}-V_{RSN})$ threshold value output signal $V_{OR}$ is set to "+1." As mentioned earlier, the purpose for having two comparators 106 and 108 is to accommodate pulse signals that are transmitted in accordance to alternate marked inversion AMI scheme. Under this scheme, when a binary one pulse signal is followed by another binary one pulse signal, one AMI pulse signal is represented as "+1" and the other AMI pulse signal is represented as "-1." It is desired that slicer 38 generates a "+1" signal when $V_{41}-V_{42}$ reaches a magnitude of more than $(V_{RSN}-V_{RS})$, for both positive and negative pulses.

When signal $V_{OT}$ is set to "+1" slicer 38 indicates that the received pulse was a positive AMI pulse signal. Conversely, when signal $V_{OR}$ is set to "+1", slicer 38 indicates that the received pulse was a negative AMI pulse signal. Amplifier 110 is biased by signals $V_{RP}$ and $V_{RPN}$ via resistance network 120 and 122 respectively, such that when $V_{41}-V_{42}$ reaches some threshold, such as $(V_{RPN}-V_{RP})$, signal $V_{Of}$ may become substantially equal to "+1."

During operation, slicer 38 receives pulse signal $V_4$, and determines whether its amplitude is more than $(V_{RSN}-V_{RS})$. For pulse signals transmitted in accordance to AMI scheme, slicer 38 also determines whether the amplitude of signal $V_4$ is less than $(V_{RSN}-V_{RS})$. For pulse signals having a magnitude larger than $(V_{RSN}-V_{RS})$ for positive AMI pulse signals, and smaller than $(V_{RS}-V_{RSN})$ for negative AMI pulse signals, slicer 38 sets one of the signals $V_{OT}$ and $V_{OR}$ to "+1." Furthermore, when pulse signal $V_4$ is substantially equal or larger than $(V_{RPN}-V_{RP})$, slicer 38 sets signal $V_{OF}$ to "+1." As illustrated in FIG. 3, for this particular embodiment, the peak voltage value received by peak detecting equalizer 34 is approximately $(V_{RPN}$ and $V_{RP})$. Therefore, slicer 38 is designed to provide an indication signal $V_{OF}$, when pulse signals received by equalizer 34 reach this value.

Charge Pump 40

Figure 6:
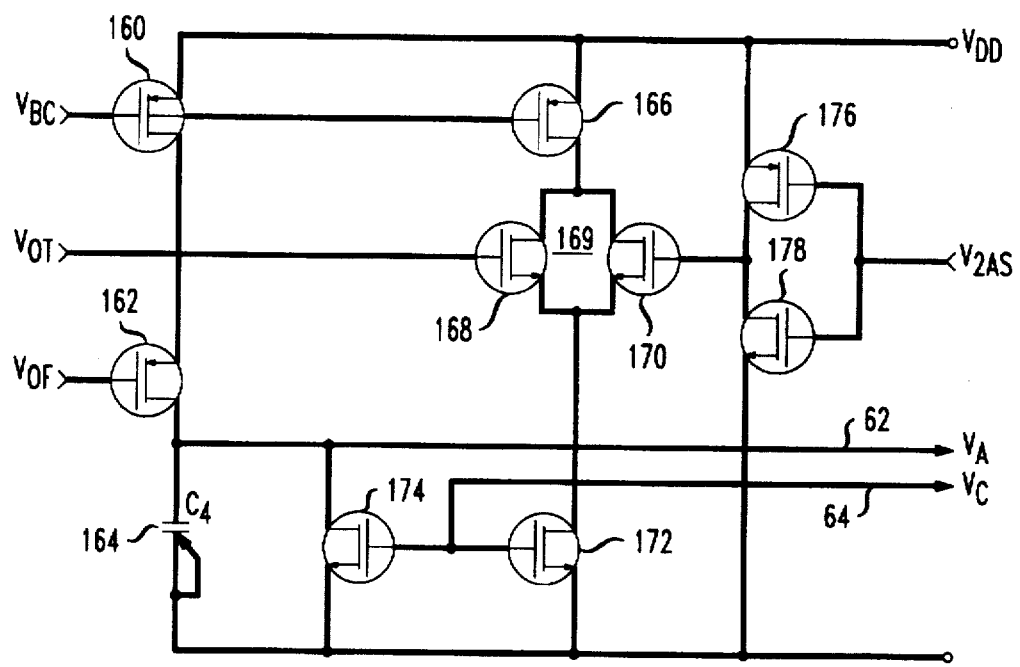
FIG. 6 illustrates a block diagram of a charge pump employed in one embodiment of the present invention.

Charge pump 40, as illustrated in FIG. 6, provides a voltage signal $V_A$, which indicates that peak detecting equalizer 30 has substantially stabilized. Charge pump 40 includes a biasing p-channel transistor 160, which is configured to receive a biasing signal $V_{BC}$ at its gate. The "aspect ratio" of transistor 160 is 14.4/1 in accordance with one embodiment of the invention. The "aspect ratio" of a transistor is the ratio defined by the width over the length of the gate of the transistor. The source terminal of transistor 160 is coupled to a voltage supply signal $V_{DD}$. The gate of transistor 160 is also coupled to the gate of a p-channel current source transistor 166 having an "aspect ratio" of 1.9/1 in this particular embodiment. It is noted that by employing the same biasing voltage $V_{BC}$, the current of transistor 160 is substantially larger than the current in transistor 166. The source of transistor 166 is coupled to the voltage supply signal $V_{DD}$. The operation of current source transistors is well-known and described in *Analog Integrated Circuits*, Socolof (Prentice Hall, 1982), incorporated herein by reference. Basically, a current source transistor is biased to operate in its saturation region.

Charge pump 40 also includes a p-channel transistor 162, having an "aspect ratio" of 14.4/1. Transistor 162 is configured to receive signal $V_{OF}$ at its gate. The source terminal of transistor 162 is coupled to the drain terminal of transistor 160. The drain terminal of transistor 162 is coupled to one terminal of capacitor 164. The other terminal of capacitor 164 is coupled to ground. In one embodiment of the invention the value of capacitor 164 is 1 µF.

The drain terminal of transistor 166 is coupled to a gate 169, which comprises n-channel transistors 168 and 170. The respective drain terminals of transistors 168 and 170 are coupled together and to the drain terminal of transistor 166. Likewise, the respective source terminals of transistors 168 and 170 are coupled together and to the drain terminal of a n-channel transistor 172. The gate terminal of transistor 168 is configured to receive signal $V_{OT}$, from slicer 38 of FIGS. 1 and 5. The gate terminal of transistor 170 is configured to receive a biasing signal generated by transistors 176 and 178.

The source terminal of transistor 172 is coupled to ground. Transistor 172 has an aspect ratio of about 14.4/2. The gate terminal of transistor 172 is coupled to its drain terminal and to the gate terminal of an n-channel transistor 174, and to signal line 64, which provides voltage signal, $V_C$. The source terminal of transistor 174 is coupled to ground. The drain terminal of transistor 174 is coupled to the drain terminal of transistor 162 and to feedback signal line 62, which provides voltage signal, $V_A$. The aspect ratio of transistor 174 is about 2.9/2.

During operation, voltage signal $V_{BC}$, provides a biasing signal to transistors 160 and 166. Assuming that the input signal $V_{41}-V_{42}$ to slicer 38 of FIGS. 1 and 5 is much larger than $(V_{RPN}-V_{RP})$, voltage signal $V_{OF}$, remains substantially low. In response, transistor 162 is turned "on" and may conduct a current flow to charge capacitor 164. As capacitor 164 charges, the voltage signal $V_A$, across the capacitor increases. In response, the poles and zeros of equalization stage 36 (FIG. 1) change to better equalize the input pulse signals $V_1$ (FIG. 1). As a result, the peak voltage detected by equalization stage 36 decreases. At some point, the input signal $V_{41}-V_{42}$ to slicer 38 reaches approximately $(V_{RPN}-V_{RP})$. In response, voltage signal, $V_{OF}$, increases and as a result, the current flowing through transistor 162 drops substantially. Meanwhile, voltage signal $V_{OT}$ becomes substantially high when slicer 38 detects a positive pulse signal. In response gate 169 conducts a current through current source 172 and in turn transistor 174. Capacitor 164 begins to discharge through a current path provided by transistor 174. Voltage signal $V_A$ begins to decrease. Transistors 162, and 174 are configured Such that voltage signal $V_A$ remains substantially constant when voltage signal $(V_{41}-V_{42})$ is approximately equal to $(V_{RPN}-V_{RP})$. As voltage signal $V_A$ stabilizes, peak detecting equalizer 34 achieves substantial equalization.

"1,0" Detector 42

Figure 7:
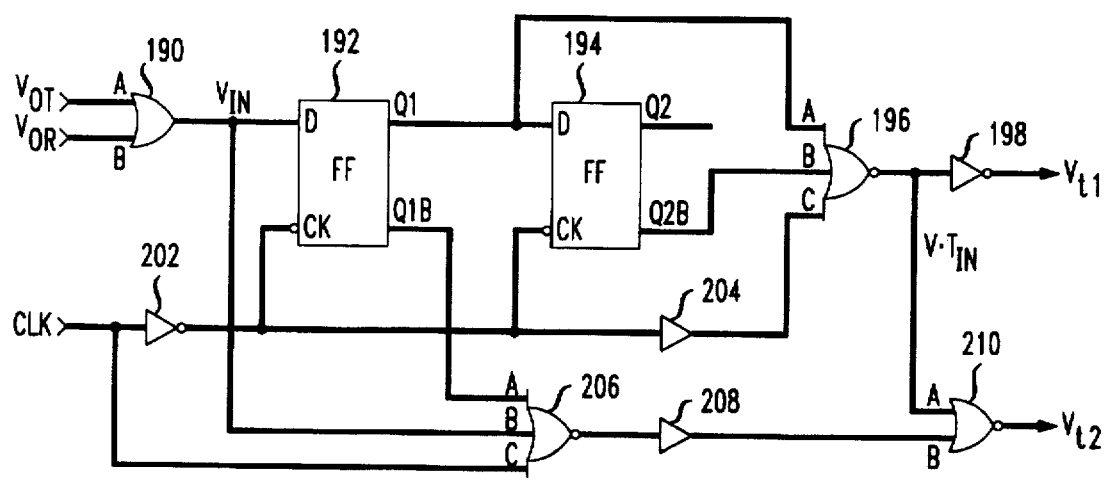
FIG. 7 illustrates a "1,0"detector in accordance with one embodiment of the present invention.

FIG. 7 illustrates an embodiment of a "1,0" detector in accordance with the present invention, although the invention is not limited in scope to this embodiment. Detector 42 is configured to detect a logical "1" signal followed by a logical "0" signal for signals transmitted in accordance with alternate marked inversion AMI scheme described above. Thus, detector 42 detects a "+1" signal followed by a "0" signal, just as well as a "−1" signal followed by a "0" signal.

Detector 42 includes an OR gate 190 configured to receive both voltage signals $V_{OT}$ and $V_{OR}$ from slicer 38. The output signal of OR gate 190 is coupled to an input terminal of a flip flop 192 and to an input terminal B of a NOR gate 206. Output signal Q1 of flip flop 192 is coupled to an input terminal of a second flip flop 194. Output signal Q1B of flip flop 192 is coupled to an input terminal A of NOR gate 206. An inverter 202 is configured to receive a clock signal CLK. The output signal of inverter 202 is coupled to the input clock terminals of flip flops 192 and 194 respectively, and to an input terminal of a buffer 204. Clock signal CLK is directly coupled to input terminal C of NOR gate 206.

Output signal Q1 of flip flop 192 is coupled to the input terminal A of a NOR gate 196. Likewise, output signal Q2B of flip flop 194 is Coupled to the input terminal B of NOR gate 196. The output terminal of buffer 204 is coupled to the input terminal C of NOR gate 196. The output terminal of NOR gate 196 is coupled to the input terminal of an inverter 198 and to the input terminal A of a NOR gate 210. The output terminal of NOR gate 206 is coupled to the input terminal of a buffer 208. The output terminal of buffer 208 is coupled to the input terminal B of NOR gate 210. The output terminal of inverter 198 provides voltage signal $V_{r1}$, and the output terminal of NOR gate 210 provides voltage signal $V_{r2}$. The operation of "1,0" detector 42 is explained in more detail hereinafter in conjunction with FIG. 3.

During operation, slicer 38 generates either a voltage signal $V_{OT}$ or a voltage signal $V_{OR}$ depending on the polarity of the voltage signal provided at the input terminal of slicer 38. Since voltage signals, $V_{OT}$ and $V_{OR}$ are mutually exclusive, when $V_{OT}$ is a logical "1", $V_{OR}$ is a logical "0," and when $V_{OR}$ is a logical "1," $V_{OT}$ is a logical "0." However, upon detection of either one, OR gate 190 provides a positive voltage signal $V_{IN}$. As illustrated by pulse signal 84 of FIG. 3, slicer 38 may generate a logical "1" prior to the occurrence of a clock signal CLK. This follows because slicer 38 generates a logical "1" when the output voltage signal $V_4$ is larger than approximately half of peak voltage. However the clock signal occurs when the input voltage signal $V_4$ has reached its peak detection voltage.

Flip flop 192 is a "D" type flip flop, which is well-known. Flip flop 192 receives the clock signal CLK. For a signal rate of 1.544 MHZ, the clock signal period is 644 nano seconds. For example, with reference to FIG. 3, the first clock signal CLK for pulse signal 82 may occur at time 1.9. When a clock signal, CLK, occurs, voltage signal Q1 of flip flop 192 acquires the same magnitude as voltage signal $V_{IN}$. When the next clock signal, CLK, occurs at about time 2.544, voltage signal Q2 of flip flop 194 acquires the same magnitude as voltage signal $V_{IN}$.

When the input voltage signal to detector 42 is a logical "1" followed by a logical "0," voltage signal Q1 becomes "1" after the first clock signal. For the second clock cycle, voltage signal Q2 becomes "1," and voltage signal Q1 goes to "0." Thus, voltage signal Q2B of flip flop 194 becomes a logical "0" also. Voltage signals Q1 and voltage signal Q2B are coupled to input terminals A and B of NOR gate 196. At the time that second clock cycle occurs, the output of buffer 204 is also "0." As a result the output signal of NOR gate 196 becomes "1." In response, the output signal $V_{r1}$ of inverter 198 goes to "0." It is noted that the purpose of buffer 204 is to give flip-flop 194 enough time to generate voltage signal Q2B before input terminal C of NOR gate 196 changes to zero. The output signal $V_{r1}$ goes to "0" only when the input voltage signal to detector 42 is a logical "1" followed by a logical "0." For other situations where the input voltage signal to detector 42 is a "1" followed by another "1" or when a "0" is followed by "1" or when a "0" is followed by "0," the output signal $V_{r1}$ remains at "1." Thus voltage signal $V_{r1}$, indicates the occurrence of a logical "1" followed by a logical "0" during the following clock cycle, at the time that the next clock signal occurs.

As will be explained in more detail hereinafter with reference to FIG. 8, pulse shape detector 46 detects an under shoot by comparing the magnitude of voltage signal $V_4$ with a predetermined threshold when voltage signal $V_{r1}$ goes to "0."

Voltage signal $V_{r2}$ is generated to allow pulse shape detector 46 to detect any occurrences of over shoot as indicated by pulse signal 86 in FIG. 3. For example, if a logical "1" is detected in a first clock cycle and a logical "0" is detected in a second clock cycle, at the beginning of the second clock cycle the voltage signal at terminal A of NOR gate 206 is "0" and the voltage signal at terminal B of NOR gate 206 is also "0." Thus, when the clock signal, CLK, goes to "0", the output signal of NOR gate 206 goes to "1." At this time, the output signal of NOR gate 196 is "0" and thus the output signal $V_{r2}$, of NOR gate 210, goes to "0." Voltage signal $V_{r2}$ remains at "0" until the occurrence of the next clock signal, CLK. Thus, voltage signal $V_{r2}$ allows pulse shape detector 46 to detect the occurrence of overshoot from approximately the second clock cycle.

Pulse Shape Detector 46

Figure 8:
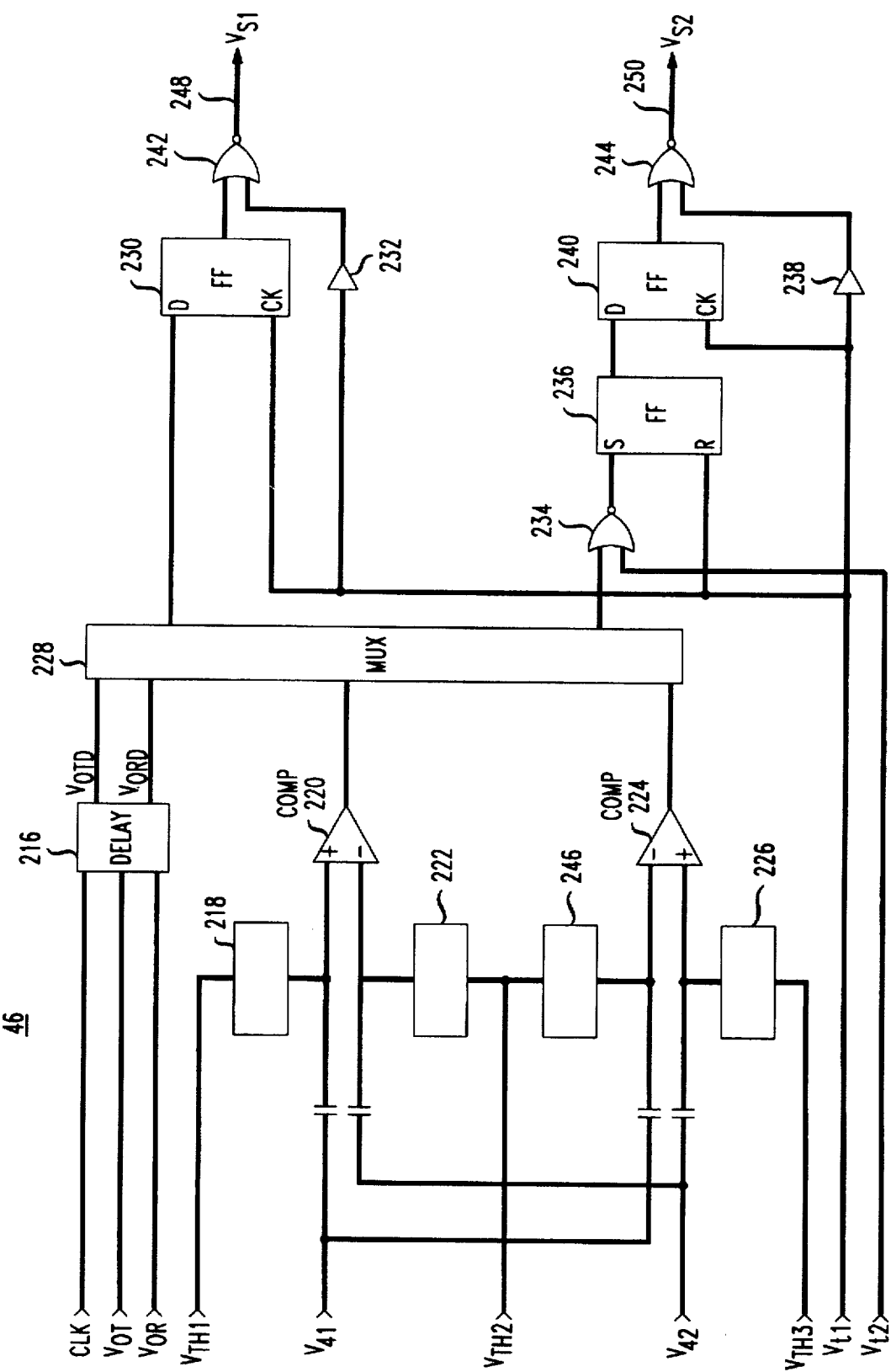
FIG. 8 illustrates a block diagram of a pulse shape detector in accordance with one embodiment of the present invention.

FIG. 8 illustrates an embodiment of pulse shape detector in accordance with the present invention. However, the invention is not limited in scope in this context. Pulse shape detector 46 comprises a first and second comparators 220 and 224 respectively. The first input terminal of comparator 220 is configured to receive voltage signal $V_{41}$, and a biasing threshold voltage $V_{TH1}$, which may be applied to the first input terminal via a resistance network 218. The second input terminal of comparator 220 is configured to receive voltage signal $V_{42}$ and a biasing threshold voltage signal $V_{TH2}$, which may be applied to the second input terminal via a resistance network circuit 222. Likewise, the first input terminal of comparator 224 is configured to receive voltage signal $V_{41}$, and a biasing voltage signal $V_{TH2}$, which may be applied to the first input terminal via a resistance network 246. The second input terminal of comparator 224 is configured to receive voltage signal $V_{42}$, and a biasing voltage signal $V_{TH1}$, which may be applied to the second input terminal via a resistance network 226. The output terminals of comparators 220 and 224 are coupled to the input terminals of a multiplexer 228.

A delay circuit 216 is configured to receive the clock signal, CLK, and voltage signals $V_{OT}$ and $V_{OR}$ respectively. The output terminals of delay circuit 216 are coupled to the remaining input terminals of multiplexer 228. The first output terminals of multiplexer 228 is coupled to an input terminal of latch flip flop 230. The second output terminal of multiplexer 228 is coupled to an input terminal of a NOR gate 234. Voltage signal $V_{r1}$ is coupled to the clock terminal of latch flip flop 230 and to the input terminal of buffer 232. It is also coupled to the clock terminal of a latch flip flop 240, and to an input terminal of a buffer 238. The output terminal of flip flop 230 is coupled to an input terminal of a NOR gate 242. The output terminal of buffer 232 is coupled to the remaining input terminal of NOR gate 242.

Voltage signal $V_{r2}$ at is coupled to the remaining input terminal of NOR gate 234, and to an input terminal R of an SR latch flip flop 236. The output terminal of NOR gate 234 is coupled to the remaining input terminal "S" of latch flip flop 236, which is referred as an SR flip flop. The output terminal of flip flop 236 is coupled to the remaining input terminal of flip flop 240, which is referred to as a D flip flop. The output terminal of flip flop 240 is coupled to an input terminal of a NOR gate 244. The output terminal of buffer 238 is coupled to the remaining input terminal of NOR gate 244. The output signals of pulse shape detector 46 is provided via lines 248 and 250. Biasing circuit 44 (FIG. 1) provides predetermined threshold voltage signals $V_{TH1}$ and $V_{TH2}$ to pulse shape detector 46.

The purpose of pulse shape detector 46 is to determine whether input signals to equalizer 30 experience any undershoots or overshoots. During operation, comparator 220 compares voltage signal $V_{41}-V_{42}$ with a positive threshold signal $V_{TH2}-V_{TH1}$. Conversely, comparator 224 compares voltage signal $V_{41}-V_{42}$ with a negative threshold signal $V_{TH1}-V_{TH2}$.

For a positive going AMI voltage signal "1", an undershoot is detected when voltage signal $V_4$ is larger than a predetermined positive voltage ($V_{TH2}-V_{TH1}$). For this voltage signal, an over shoot is detected when voltage signal $V_4$ is smaller than a predetermined negative voltage ($V_{TH1}-V_{TH2}$). Thus, if there is an undershoot, the output signal of comparator 220 goes to "1." If there is an overshoot, the output signal of comparator 224 goes to "1." Multiplexer 228 receives either one of the overshoot or undershoot indication signal. For a positive going voltage signal "1" delay circuit 216 provides a voltage signal $V_{OTD}$, to multiplexer 228 at the beginning of the second clock cycle. In response, multiplexer 228, provides the output of comparator 220, indicating undershoot, to the input terminal of flip flop 230. Multiplexer 228 provides the inverted version of the output of comparator 224, indicating over shoot to the input terminal of NOR gate 234. It is noted that there is an inverter used in multiplexer 228 for the second path, where it provides the inverted version.

For a negative going AMI voltage signal "1", an undershoot is detected when voltage signal $V_4$ is smaller than the predetermined negative voltage ($V_{TH1}-V_{TH2}$). For this voltage signal, an over shoot is detected when voltage signal $V_4$ is larger than a predetermined positive voltage $V_{TH2}-V_{TH1}$. Thus, if there is an undershoot, the output signal of comparator 224 goes to "1." If there is an overshoot, the output signal of comparator 220 goes to "1." Multiplexer 228 receives either one of the overshoot or undershoot indication signal. For a negative going voltage signal "1" delay circuit 216 provides a voltage signal $V_{ORD}$, to multiplexer 228. In response, multiplexer 228, provides the output of comparator 224, indicating undershoot, to the input terminal of flip flop 230. Multiplexer 228, provides the complement of the output of comparator 220, indicating over shoot, to the input terminal of NOR gate 234.

When voltage signal $V_{r2}$ is indicated by a logical "0," and there is also an indication of overshoot, the output of NOR gate 234 goes to "1." However, this overshoot indication remains in a latch, until voltage signal $V_{r1}$ indicates that the equalizer has received a logical "1" signal followed by a logical "0" signal. Thereafter, voltage signal $V_{S2}$ is provided through line 250, indicating that an over shoot has occurred. Likewise, when voltage signal $V_{r1}$ is indicated and there is also an indication of undershoot, the output signal of flip flop 230 provides voltage signal $V_{S1}$ through NOR gate 242, indicating that an under shoot has occurred. Because the overshoot indication signal is a short pulse, SR flip-flop 236 is necessary to capture this signal. The purpose of D-flip-flop 230 and 240 is to sample the undershoot or overshoot indication signals at the middle of the second clock cycle.

Timing Circuit 50

Figure 9:
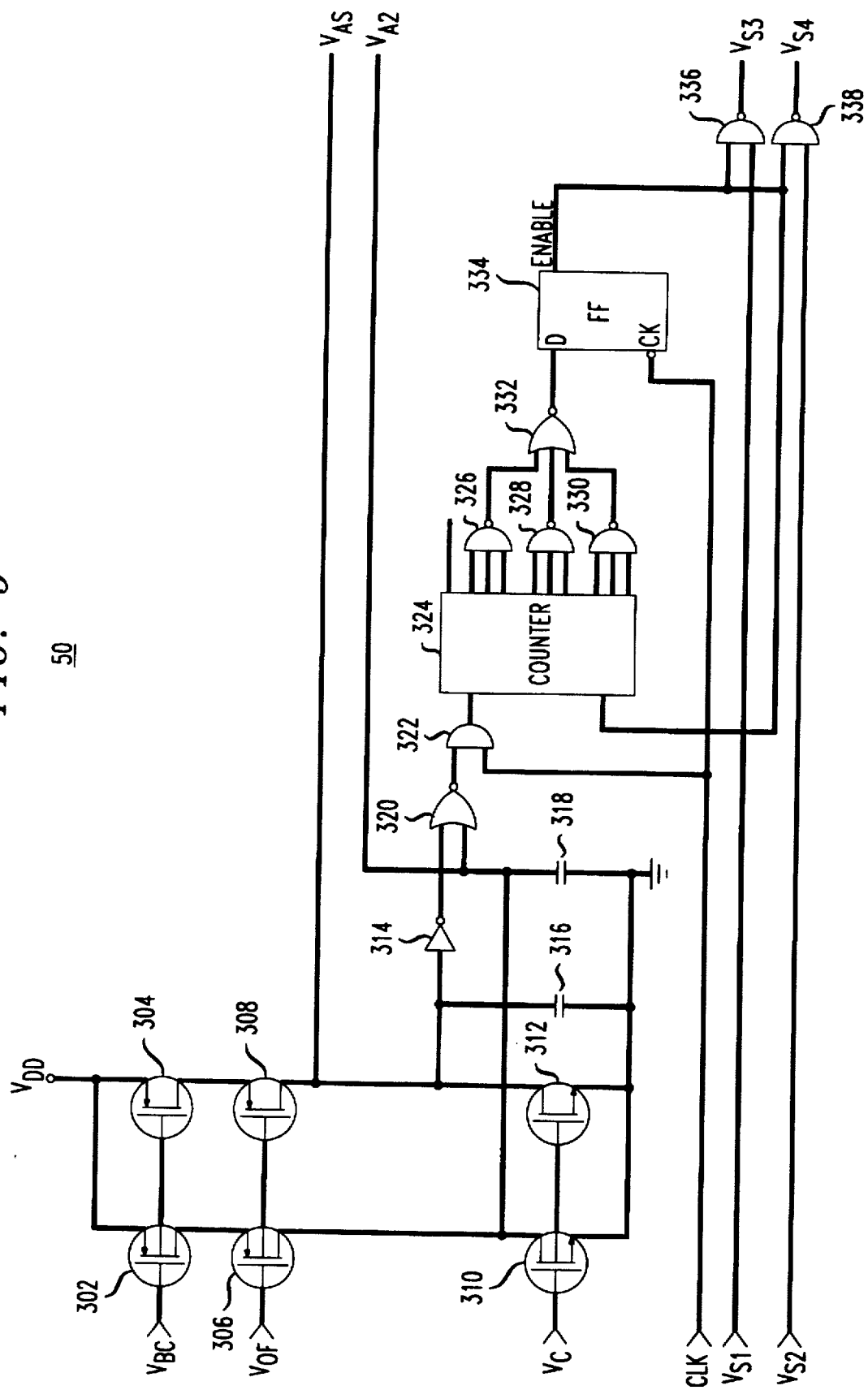
FIG. 9 illustrates a block diagram of a timing circuit in accordance with one embodiment of the present invention.

FIG. 9 illustrates one embodiment of a timing circuit 50 in accordance with the present invention. Timing circuit 50 operates in conjunction with charge pump 40. It is employed to detect the time that equalizer 34 becomes stabilized. Timing circuit 50 comprises a p-channel transistor 302 configured to receive biasing voltage signal $V_{BC}$ at its gate terminal. The gate terminal of transistor 302 is coupled to the gate terminal of a p-channel transistor 304. The respective source terminals of transistors 302 and 304 are coupled together and to power supply voltage signal $V_{DD}$. The drain terminal of transistor 302 is coupled to the source terminal of a p-channel transistor 306. The gate terminal of transistor 306 is configured to receive the voltage signal $V_{OF}$ from slicer 38 via signal line 60 (FIG. 1). The gate terminal of transistor 306 is coupled to the gate terminal of a p-channel transistor 308. The source terminal of transistor 308 is coupled to the drain terminal of transistor 304.

The drain terminals of transistors 306 and 308 are respectively coupled to the drain terminals of an n-channel transistor 310 and an n-channel transistor 312. The gate terminals of transistors 310 and 312 are coupled together to receive the voltage signal $V_C$ from charge pump 40 via signal line 64 (FIG. 1). The source terminals of transistors 310 and 312 are respectively coupled to the ground terminal. The drain terminal of transistor 306 is coupled to one terminal of a capacitor 318. The other terminal of capacitor 318 is coupled to ground. The drain terminal of transistor 308 is completed to one terminal of a capacitor 316 which has another terminal shorted to ground.

Capacitor 316 is coupled to an input terminal of an inverter 314. The output terminal of inverter 314 is coupled to one input terminal of a NOR gate 320. The remaining input terminal of NOR gate 320 is configured to receive the voltage signal across capacitor 318. The output terminal of NOR gate 320 is coupled to an input terminal of an AND gate 322. The remaining input terminal of AND gate 322 is configured to receive clock signal, CLK.

The output terminal of AND gate 322 is coupled to the clock terminal of a 10 bit counter 324. The output terminals of counter 324 is coupled to NAND gates 326, 328 and 330 respectively. The output terminals of these NAND gates are coupled to input terminals of a NOR gate 332. The output terminal of NOR gate 322 is coupled to an input terminal of a flip flop 334. The clock terminal of flip flop 334 is configured to receive the complement of clock signal CLK.

The output terminal of flip flop 334 is coupled to input terminals of AND gates 336 and 338 respectively and to the reset terminal of counter 324. The remaining input terminal of AND gate 336 is configured to receive signal $V_{S1}$ from pulse shape detector 46. The remaining input terminal of AND gate 338 is configured to receive signal $V_{S2}$ from pulse shape detector 46. The output terminal of AND gate 336 provides a voltage signal $V_{S3}$ to an input terminal of a programmable counter circuit 52, and, the output terminal of AND gate 338 provides a voltage signal $V_{S4}$ to the other input terminal of programmable counter circuit 52.

The principle of operation of timing circuit 50 is substantially similar to that of charge pump 40. Thus, when voltage signal $V_{OF}$ is substantially small, capacitors 318 and 316 may be charged by a current flowing through transistors 306 and 308. As the magnitude of voltage signal $V_{OF}$ increases the current flowing through transistors 306 and 308 begin to decrease, until it becomes substantially low. At this time, capacitor 318 may begin to discharge through transistor 310, and, capacitor 316 may begin to discharge through transistor 312.

However, because, the aspect ratio of transistor 310 is designed to be larger than the aspect ratios of transistor 312 and transistor 174 of FIG. 6, capacitor 318 discharges at a substantially faster rate than the discharge rate in capacitor 316 and capacitor 164 of FIG. 6. Furthermore, because the aspect ratio of transistor 312 is smaller than the aspect ratio of transistor 174, capacitor 316 discharges at a substantially lower rate than the discharge rate in capacitor 164 of FIG. 6. Therefore, when equalizer 34 is stable which results in $V_A$ in FIG. 6 to be near constants the voltage across capacitor 318 becomes substantially low and equal to a logical "0", and the voltage across capacitor 316 becomes substantially large and equal to a logical "1." This further results in the output of NOR gate 320 going to logic "1" which indicates that charge pump 40 is stable. The purpose of timing circuit 50, in accordance with this particular embodiment of the invention, is to detect such stabilization. It is noted that timing circuit 50 may be configured to operate based on detection of an actual stabilization in equalizer 34.

At the next clock cycle, the output of AND gate 322 becomes "1" and counter 324 begins counting for 1023 clock cycles. Counter 324 continues counting as long as its clock input is logical "1." The purpose of counter 324 is to give enough time for the loop inside of equalizer 34 to substantially stabilizes and the loop outside of equalizer 34 to start operating. After the 1023 counts, AND gates 336 and 338 are enabled, when voltage signal CLK becomes "0." Voltage signals $V_{S1}$ and $V_{S2}$ may then be provided to programmable counter 52 via these AND gates. At the same time counter 324 is reset and the output of NOR gate 332 becomes "0" again. After voltage signal CLK becomes logical "0" again, the output of flip-flop 334 goes to "0" and the outputs of AND gates 336 and 338 go to "0." Then $V_{S1}$ and $V_{S2}$ signals are blocked from reaching programmable counter 52. The purpose of blocking these signals is that once these signals are initially passed, the gain in the programmable gain amplifier 32 (FIG. 1) may change. This may cause equalizer 34 to become unstable. As a result, the stabilization of equalizer 34, needs to be detected as explained above, to ensure that the feedback loops inside and outside of equalizer 34 are not unstable at the same time.

In summary, the timing circuit functions as a gate for allowing overshoot indication signal $V_{B2}$ or undershoot indication signal $V_{B1}$ be provided to programmable counter 52, at a time when equalizer 34 has been substantially stabilized. As the count at the output of programmable counter 52 changes, the amplification factor at programmable amplifier 32 also changes. The timing circuit then prevents the passage of following overshoot and undershoot indication signals until equalizer 34 stabilizes again. It will be appreciated that the configuration of timing circuit 50, which estimates the time equalizer 34 has stabilized, is substantially more simple than a circuit configured to detect the actual stabilization of equalizer 34.

Programmable Counter 52

Figure 10:
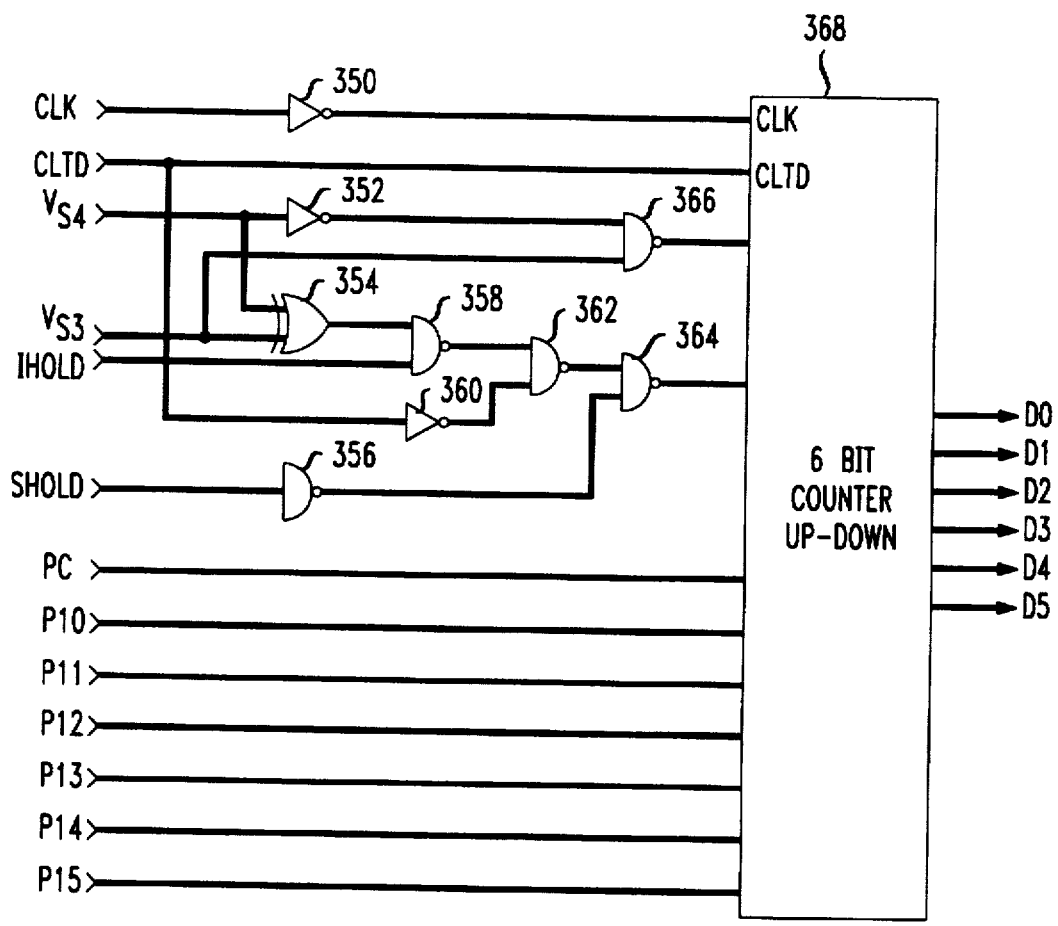
FIG. 10 illustrates a block diagram of a programmable counter in accordance with one embodiment of the present invention.

FIG. 10 illustrates one embodiment of programmable counter 52 in accordance with the invention, although the invention is not limited in scope in this respect. Counter 52 comprises an inverter 350 configured to receive clock signals CLK at its input terminal and provide the inverted versions of the clock signals to the clock terminal of an up/down counter 368.

Overshoot indication signal $V_{S4}$ is coupled to the "up/down" count terminal of counter 368 via an inverter 352 coupled to a NAND gate 366. When $V_{S4}$ is a logical "1," counter 368 counts up. Undershoot indication signal, $V_{S3}$ is coupled to the other input terminal of NAND gate 366. When $V_{S3}$ is a logical "1"($V_{S4}$ is "0" when $V_{S3}$ is "1"), counter 368 counts down. $V_{S3}$ and $V_{S4}$ are also coupled to input terminals of EXOR gate 354. The output terminal of EXOR gate 354 is coupled to an input terminal of NAND 358. The remaining input terminal of NAND gate 358 is configured to receive an internal hold signal, IHOLD, which stops the operation of the counter. The output terminal of NAND gate 358 is coupled to an input terminal of NAND gate 362. The remaining input terminal of NAND gate 362 is coupled to voltage signal CLTD via an inverter 360. Where voltage signal CLTD is used to either load the preset voltage signals PI0 to PI5 to counter 368 (CTLD=1), or to run counter 368, (CLTD=0). The output terminal of NAND gate 362 is coupled to an input terminal of a NAND gate 364. The remaining input terminal of NAND gate 364 is configured to receive a system hold signal SHOLD via an inverter 356. Voltage signals $P_{I0}$ through $P_{I5}$ provide an initial value setting for counter 368. Preferably, counter 368 begins with a count 31.

Up/down counter 368 increments its count by a predetermined number, for example, "1" when overshoot indication signal, $V_{S4}$ is a logical "1." Up/down counter 368 decrements its count by a predetermined number, for example "1", when undershoot indication signal, $V_{S3}$ is a logical "1." This increments may increase until the count of the counter reaches 60. Conversely the decrements may decrease until the count of the counter reaches 4. At this point the counter ceases to increment or decrement its value any more by setting IHLDN to logical "0". Limits 4 and 60 may be employed by a limiter circuit (not shown).

The counter begins its normal operation when CTLD signal is "0." However, when CTLD signal is set to "1", counter 368 initials its count in accordance to $P_{I0}$ through $P_{I5}$ signals. The internal hold signal IHOLD is employed when counter reaches 4 or 60. Thus, the counter remains constant when IHOLD signal is "0." The system hold signal SHOLD is employed when it is desired to set the counter count externally, for example during testing the system.

Programmable Gain Amplifier 32

FIGS. 11a through 11d illustrate an embodiment of a programmable gain amplifier in accordance with the present invention, although the invention is not limited in scope to this embodiment. Amplifier 392 is configured to amplify a differential input voltage signal $V_{IN}$ in accordance with the count information signal received from programmable counter 52 of FIGS. 1 and 10.

Variable resistor circuits 382 and 380 are coupled together in parallel and are adapted to receive input voltage signal $V_{IN1}$ and count information signal $D_0$ through $D_5$. The output terminals of variable resistor circuits 382 and 380 are coupled to the inverting terminal of amplifier 392 and to the input port of a fixed resistor circuit 388 and to one port of capacitor 390. The output port of fixed resistor 388 and the remaining port of capacitor 390 are coupled to an output port of amplifier 392, which provides voltage signal $V_{f1}$ to an input terminal of equalizer 34 of FIG. 1.

Variable resistor circuits 386 and 384 are coupled together in parallel and are adapted to receive input voltage signal $V_{IN2}$ and count information signal $D_0$ through $D_5$. The output terminals of variable resistor circuits 386 and 384 are coupled to the non-inverting terminal of amplifier 392 and to the input port of a fixed resistor circuit 396 and to one port of capacitor 394. The output port of fixed resistor 396 and the remaining port of capacitor 394 are coupled to an output port of amplifier 392, which provides voltage signal $V_{f2}$ to an input terminal of equalizer 34 of FIG. 1.

Figure 11A:
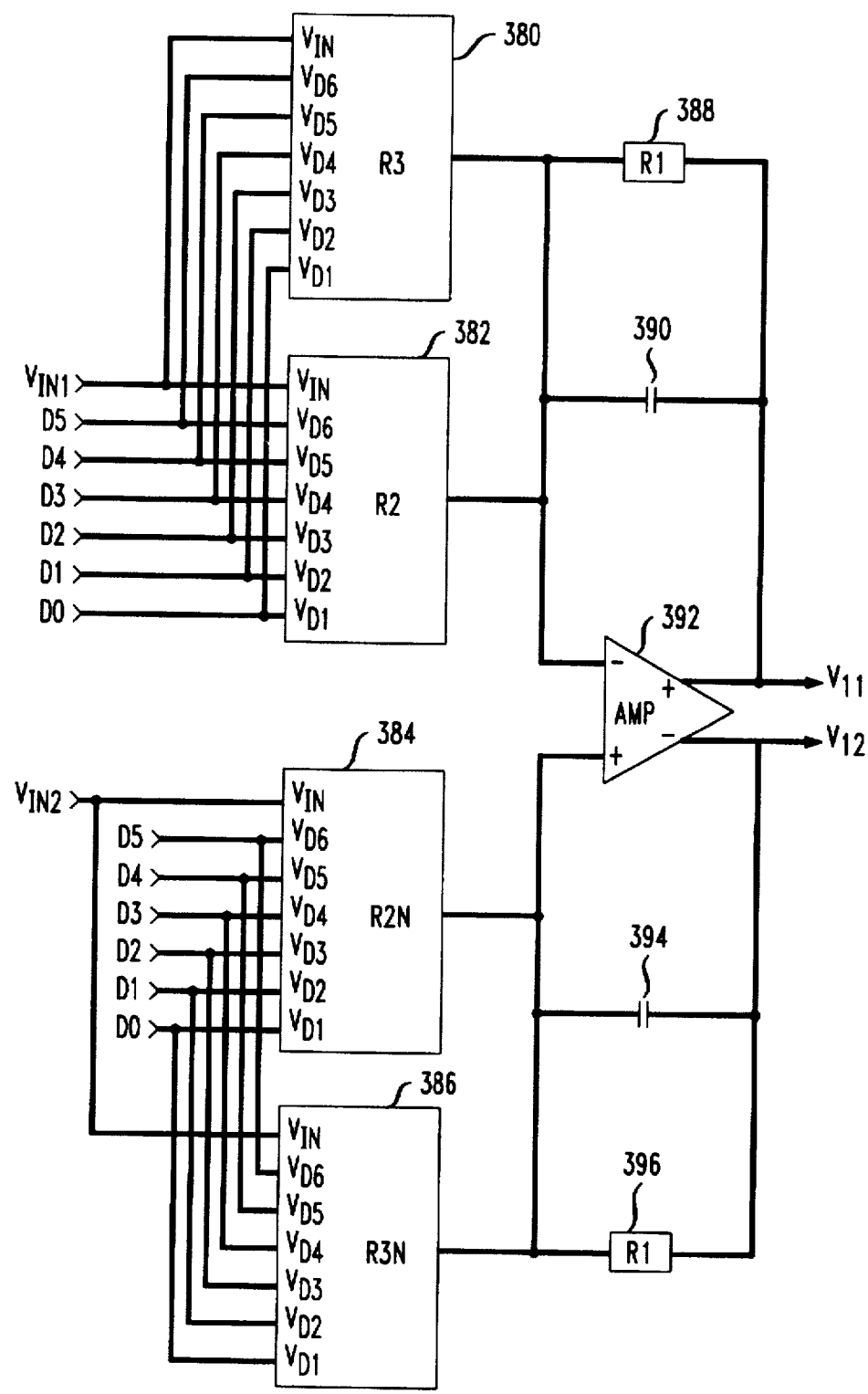
FIG. 11a illustrates a block diagram of a programmable gain amplifier in accordance with one embodiment of the present invention.
Figure 11B:
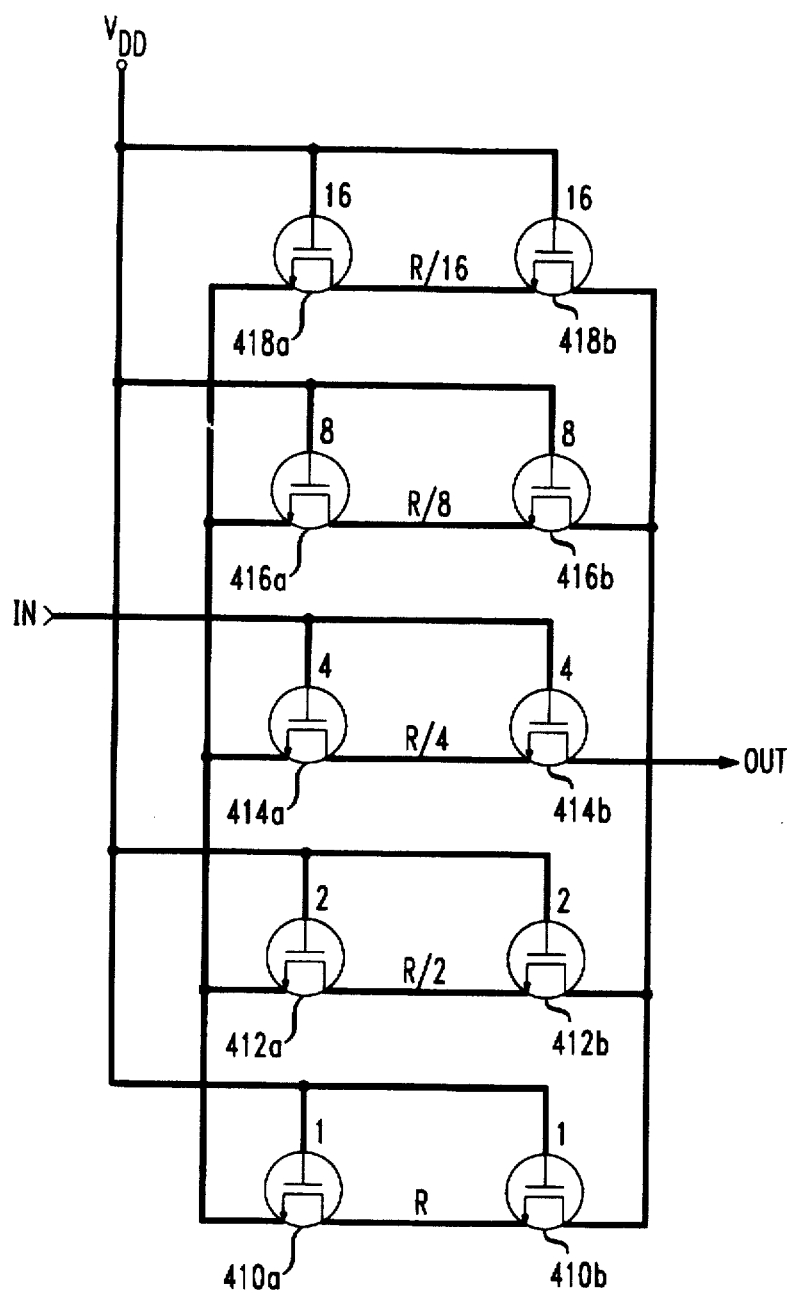
Figure 11C:
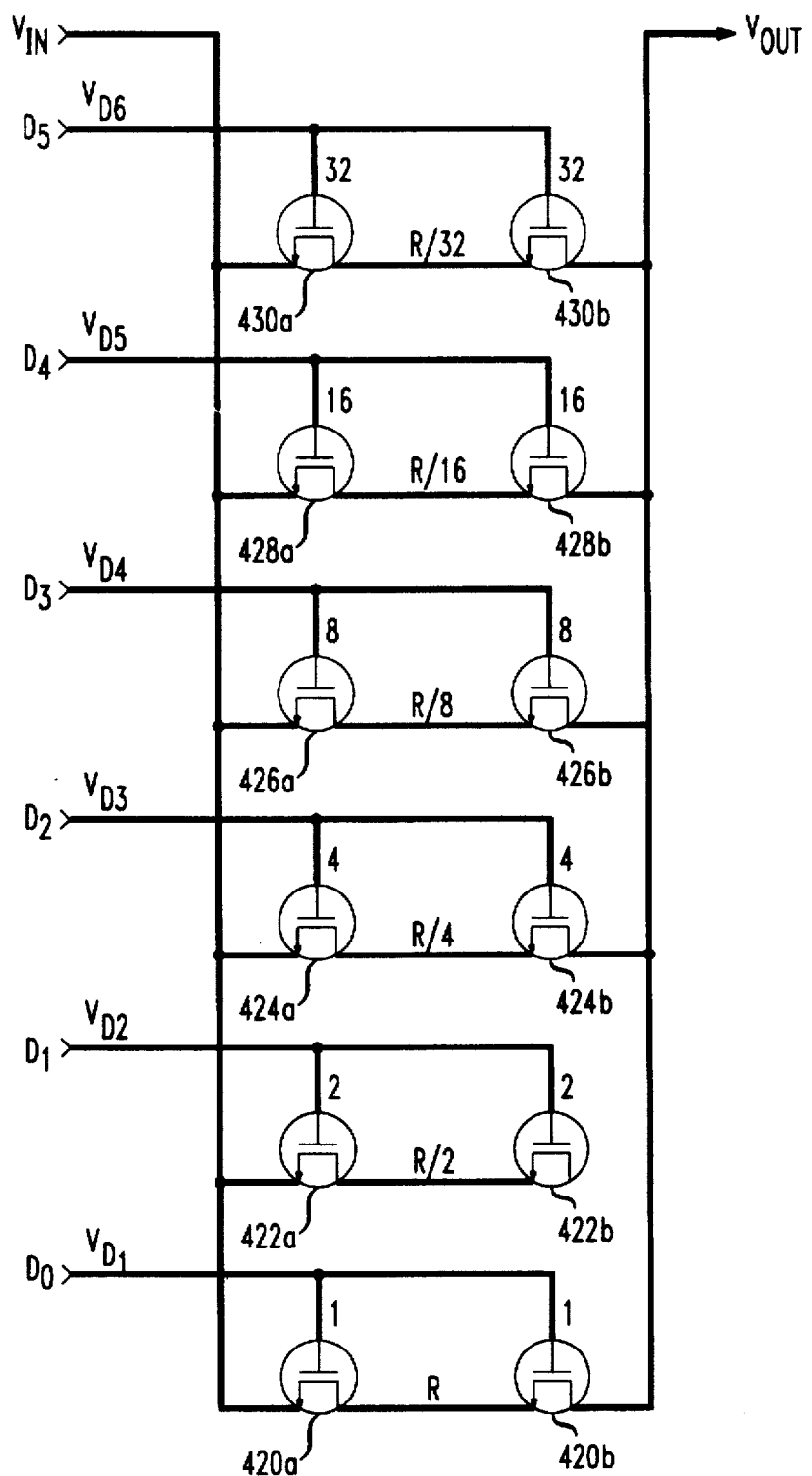
Figure 11D:
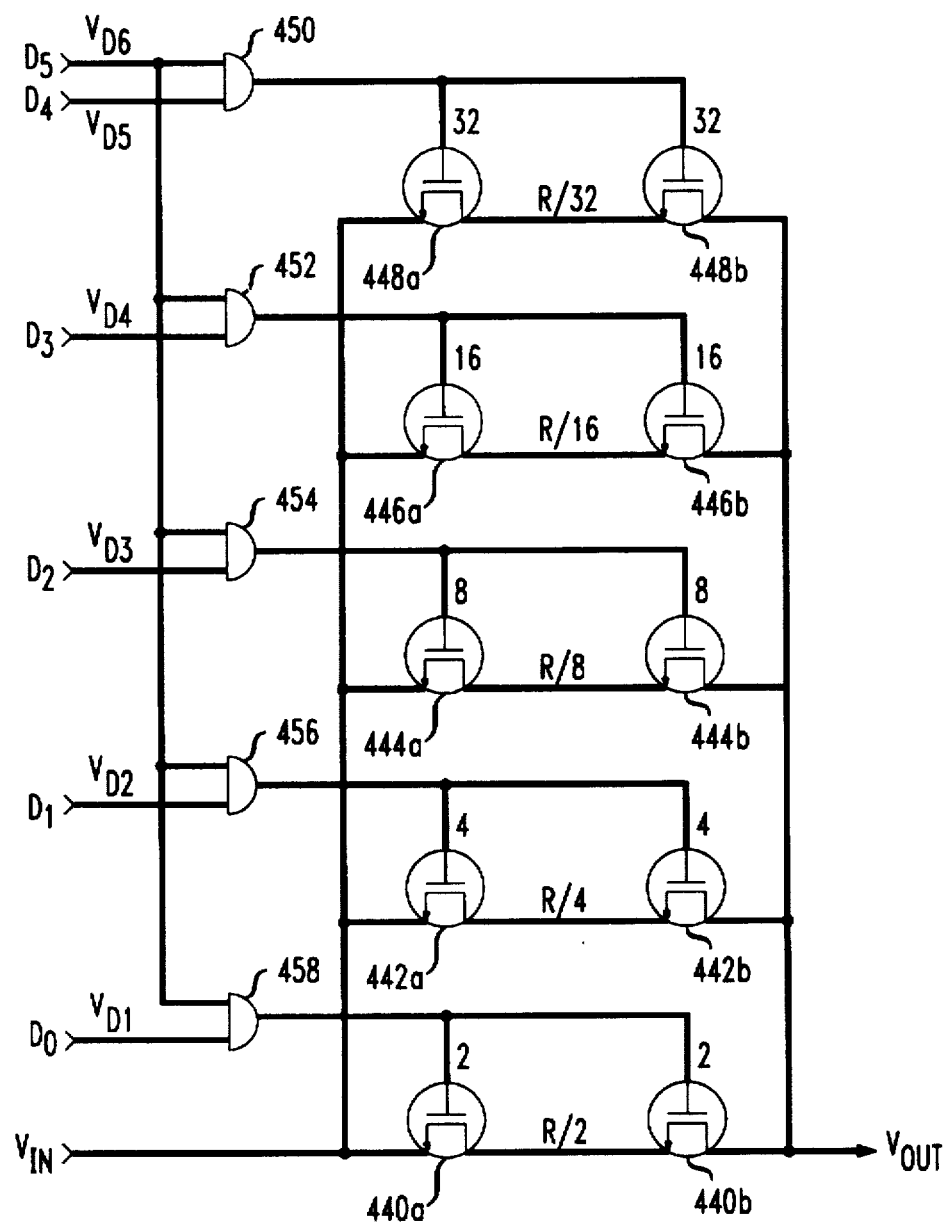

Amplifier 32 is configured to provide a substantially linear amplification in response to count increments or decrements provided by programmable counter 52. The amplification ration of amplifier 32 is substantially equal to the resistance of resistor 388 over the equivalent resistance of parallel resistors 380 and 382. As explained in more detail in reference with FIGS. 11b through 11d, the resistance of resistors 382 and 380 decreases in response to count increments provided by counter 52. For each count increment, the resistance of resistors 382 and 380 decreases proportionally. However, in order to maintain a semi-linear amplification it is desirable that the rate of decrease in resistance of resistors 382 and 380 becomes larger as the count information of counter 52 increases. For example, for counts 4 through 32, each count increment may lead to a decrease in resistance of resistor 382 and 380 at a certain rate. For counts 32 through 63 each count increment may lead to a decrease in resistance of resistor 382 and 380 at a faster rate than that for counts 4 through 32. FIGS. 11b through 11d illustrate this concept in further detail.

FIG. 11b is a circuit diagram of fixed resistor 388 in accordance with one embodiment of the present invention. Resistor 388 comprises a bank of n-channel transistors coupled together in parallel. Thus, two n-channel transistors 410a and 410b are coupled together in series such that their respective gate terminals are coupled together and to a power supply voltage signal $V_{DD}$. The drain terminal of transistor 410a is coupled to the source terminal of transistor 410b. The source terminal of transistor 410a is coupled to the input terminal IN of resistor 388. The drain terminal of transistor 410b is coupled to the output terminal OUT of resistor 388. The aspect ratio of transistors 410a and 410b are normalized to 1.

Transistors 412a and 412b are coupled together in the same way as transistors 410a and 410b. The aspect ratio of transistors 412a and 412b is normalized to 2. Likewise, transistors 414a and 414b are coupled together in the same way as transistors 410a and 410b. The aspect ratio of transistors 414a and 414b is 4. Transistors 416a and 416b are coupled together in the same way as transistors 410a and 410b. The aspect ratio of transistors 416a and 416b is 8. Finally, transistors 418a and 418b are coupled together in the same way as transistors 410a and 410b. The aspect ratio of transistors 418a and 418b is 16. Assuming that the resistance of transistors 410a and 410b is substantially equal to R, then the equivalent resistance of fixed resistor 388 is substantially equal to R/31. This follows because the resistance of transistor pair 412 is R/2; the resistance of transistor pair 414 is R/4; the resistance of transistor pair 416 is R/8; and the resistance of transistor pair 418 is R/16. The equivalent resistance of these transistors is K/31.

FIG. 11c illustrates a circuit diagram of one embodiment of variable resistor 382 in accordance with the present invention. Transistor pairs 490, 422, 424, 426, 428 and 430 are coupled together in substantially the same way as the transistors describe in reference with FIG. 11b. However, the gate terminals of each transistor pair in FIG. 11c is coupled to an output terminal of counter 52 (FIGS. 1 and 10). Thus, each transistor pair may be turned "on" or "off" in accordance with the voltage signal level at the output terminals of counter 52.

The aspect ratio of transistors 420a and 420b is also normalized to 1. The aspect ratio of transistors 422a and 422b is 2. The aspect ratio of transistors 424a and 424b is 4. The aspect ratio of transistors 426a and 426b is 8. The aspect ratio of transistors 428a and 428b is 16. Finally the aspect ratio of transistors 430a and 430b is 32.

The equivalent resistance of resistor 382 of FIG. 11c is R/n, where n is the count information form counter 52. For example, if the count signal provided by counter 52 represents 5, or binary 000101, the resistance of resistor 382 is R/5. This follows because for this example, voltage signals $V_{D1}$ and $VD_{D3}$ are high and the equivalent resistance comprises of resistors R and R/4 coupled together in parallel. If the count signal provided by counter 52 represents 31, or binary 011111, the resistance of resistor 382 is R/31. In this particular case, amplifier 32 achieves a unity gain.

FIG. 11d illustrates a circuit diagram of one embodiment of variable resistor 380 in accordance with the present invention. Transistor pairs 440, 442, 444, 446, and 448 are coupled together in substantially the same way as the transistors describe in reference with FIGS. 11b and 11c. However, the gate terminals of each transistor pair in FIG. 11d is configured to receive a voltage signal from an output terminal of an AND gate. Thus, gate terminals of transistor pair 440 are coupled to the output terminal of AND gate 458. Gate terminals of transistor pairs 442, 444, 446 and 448 are respectively coupled to the output terminal of AND gates 456, 454, 452 and 450.

One input terminal of each AND gate 450, 452, 454, 456, and 458 is configured to receive voltage signal $V_{D6}$ provided by terminal D6 of counter 52 (FIGS. 1 and 10). The other input terminal of AND gates 450, 452, 454, 456, and 458 is respectively coupled to terminals D4, D3, D2, D1 and D0 of counter 52. Thus, each transistor pair may be turned "on" or "off" in accordance with the voltage signal level at the output terminals of counter 52, whenever voltage signal $V_{D6}$ is high. Thus, resistor 380 connects in parallel with resistor 382 for count signals representing numbers larger than 31.

The aspect ratio of transistor pairs 440a and 440b is normalized to 2. The aspect ratio of transistor pairs 442a and 442b is 4. The aspect ratio of transistors 444a and 444b is 8. The aspect ratio of transistors 446a and 446b is 16. Finally, the aspect ratio of transistors 448a and 448b is 32.

For count values larger than 32, the equivalent resistance of resistors 380 and 382 is substantially equal to $$R_n = \frac{R}{32 + (n-32)*3}$$

where n is the number representing the count signal provided by counter 52. As explained above, the equivalent resistance of resistors 380 and 382 decreases nonlinearly in response to each additional increment provided by counter 52. This configuration allows amplifier 32 to exhibit a linear amplification characteristic in response to count increments provided by counter 52. It will be appreciated that the same result may be achieved by substituting fixed resistor 338 with a variable feedback resistor, and by substituting variable resistors 380 and 382 with other fixed or variable feed through resistors such that the ratio of the resistance of the feedback resistor over the resistance of feed through resistors remains substantially constant as the count signals provided by counter 52 are incremented.

It is appreciated by those skilled in the art that the adaptive equalizer in accordance with one embodiment of the present invention can be manufactured as an integrated circuit, so that it could be employed conveniently in many communication applications.

Thus, the adaptive equalizer in accordance with the present invention is capable of providing compensation for a wide range of cables having different cable characteristics and different cable lengths.

We claim:

1. An adaptive line equalizer comprising:
   a programmable gain amplifier configured to receive pulse signals transmitted over a communication channel, said programmable gain amplifier further configured to have a variable amplification factor in response to a feedback control signal;

a peak detecting equalizer adapted to receive output signals of said programmable gain amplifier;

a pulse shape detector adapted to receive pulse signals provided by said peak detecting equalizer, said pulse shape detector further adapted to generate a first indication signal indicating over-equalization and a second indication signal indicating under-equalization;

a gain control circuit adapted to receive said first and second indication signals, said control circuit further adapted to provide said feedback control signal to said programmable gain amplifier so as to vary the amplification factor of said amplifier.

2. The adaptive line equalizer in accordance to claim 1, wherein said peak detecting equalizer further generates a peak indication signal.

3. The adaptive line equalizer in accordance to claim 2, further comprising a timing circuit adapted to receive said first and second indication signals, said timing circuit further adapted to provide said first and second indication signals to said gain control circuit in response to said peak indication signal.

4. The adaptive line equalizer in accordance to claim 3, wherein said timing circuit is configured to provide said first and second indication signal to said gain control circuit after said peak detecting equalizer substantially stabilizes.

5. The adaptive line equalizer in accordance to claim 4, wherein the amplification factor of said programmable amplifier remains substantially constant, until said peak detecting equalizer is substantially stabilized.

6. The adaptive line equalizer in accordance with claim 5 further comprising a "1,0" detector configured to receive pulse signals from said peak detecting equalizer so as to generate a third indication signal to said pulse shape detector when said received pulse signals comprise a logical "1" followed by a logical "0."

7. The adaptive line equalizer in accordance with claim 6 wherein said "1,0" detector is configured to generate a fourth indication signal prior to said first indication signal.

8. The adaptive line equalizer in accordance with claim 7, wherein the magnitude of pulse signal received by said pulse shape detector is compared with a first and a second predetermined threshold upon detection of said third and fourth indication signals.

9. The adaptive line equalizer in accordance with claim 8, wherein said pulse shape detector generates said first indication signal when the magnitude of said pulse signal is larger than said first predetermined threshold, said pulse shape detector generates said second indication signal when the magnitude of said pulse signal is smaller than said second predetermined threshold.

10. An integrated circuit for adaptive line equalization comprising:

a programmable gain amplifier configured to receive pulse signals transmitted over a communication channel, said programmable gain amplifier further configured to have a variable amplification factor in response to a count signal;

a peak detecting equalizer adapted to receive output signals of said programmable gain amplifier, said peak detecting equalizer further adapted to generate a peak detection signal;

a signal detector configured to receive the output signal of said peak detecting equalizer, so as to detect the occurrence of a logical "1" followed by a logical "0", said signal detector further configured to generate a first indication signal upon detection of said occurrence and a second indication signal prior to said first indication signal;

a pulse shape detector adapted to receive output pulse signals provided by said peak detecting equalizer, said pulse shape detector further adapted to receive said first and second indication signals, said pulse shape detector further adapted to generate a third indication signal indicating over-equalization and a fourth indication signal indicating under-equalization;

a timing circuit adapted to receive said third and fourth indication signals, said timing circuit further adapted to estimate the time that said peak detecting equalizer substantially stabilizes so as to provide said third and fourth indication signals at its output terminals; and a programmable counter coupled to said timing circuit adapted to receive said third and fourth indication signals so as to increment its count by one upon detection of said third indication signal, decrement its count by one upon detection of said fourth indication signal, and remain with the same count when no third or fourth indication signal is detected, said counter further adapted to provide said count signal to said programmable gain amplifier so at to vary the amplification factor of said amplifier.

11. The adaptive line equalizer in accordance with claim 10 wherein the amplification factor of said programmable amplifier remains substantially constant, until said peak detecting equalizer is substantially stabilized.

12. The adaptive line equalizer in accordance with claim 11, wherein said pulse shape detector generates said third indication signal, when the magnitude of pulse signal received by said pulse shape detector is larger than a first predetermined threshold, and said pulse shape detector generates said fourth indication signal, when the magnitude of pulse signal received by said pulse shape detector is smaller than a second predetermined threshold.

13. The adaptive line equalizer in accordance with claim 12 wherein said peak detecting equalizer further comprises:

an equalization stage adapted to receive the output signal of said programmable gain amplifier, said equalization stage further comprising a plurality of variable poles and zeros;

a slicer adapted to receive the output signal of said equalization stage, said slicer providing a digital version of said output signal received by said programmable gain amplifier, said slicer further adapted to generate a peak voltage indication signal to be employed by said timing circuit indicating that the pulse signal received by said slicer has reached a predetermined peak voltage level; and a charge pump adapted to generate a feedback control signal coupled to said equalization stage, said charge pump further adapted to provide a signal to said timing circuit so as to indicate that said peak detecting equalizer has entered a stabilization region.

* * * * *